(12) United States Patent
Kaszas et al.

(10) Patent No.: US 8,748,530 B2
(45) Date of Patent: *Jun. 10, 2014

(54) ARBORESCENT POLYMERS AND PROCESS FOR MAKING SAME

(71) Applicants: The University of Akron, Akron, OH (US); Lanxess, Inc., Sarnia (CA)

(72) Inventors: Gabor Kaszas, Akron, OH (US); Judit E. Puskas, Akron, OH (US); Kevin Kulbaba, London (CA)

(73) Assignees: The University of Akron, Akron, OH (US); Lanxess, Inc., Sarnia, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 13/939,504

(22) Filed: Jul. 11, 2013

(65) Prior Publication Data

US 2013/0303688 A1 Nov. 14, 2013

Related U.S. Application Data

(63) Continuation of application No. 13/600,687, filed on Aug. 31, 2012, which is a continuation of application No. 12/439,034, filed as application No. PCT/US2007/019280 on Aug. 31, 2007, now Pat. No. 8,258,230.

(60) Provisional application No. 60/841,757, filed on Sep. 1, 2006.

(51) Int. Cl.
  *C08L 27/12* (2006.01)
  *C08G 63/48* (2006.01)

(52) U.S. Cl.
  USPC .................................. 524/544; 524/576

(58) Field of Classification Search
  USPC .......................................... 524/544
  See application file for complete search history.

(56) References Cited

U.S. PATENT DOCUMENTS

| | | | | |
|---|---|---|---|---|
| 4,910,261 A | * | 3/1990 | Kaszas et al. | 525/314 |
| 4,946,899 A | * | 8/1990 | Kennedy et al. | 525/244 |
| 6,747,098 B2 | * | 6/2004 | Puskas et al. | 525/314 |

* cited by examiner

*Primary Examiner* — Hui Chin
(74) *Attorney, Agent, or Firm* — Reener Kenner; Greive Bobak

(57) ABSTRACT

The present invention relates to arborescent polymers and to a process for making same. In one embodiment, the present invention relates to arborescent polymers formed from at least one inimer and at least one isoolefin that have been end-functionalized with a polymer or copolymer having a low glass transition temperature ($T_g$), and to a process for making such arborescent polymers. In another embodiment, the present invention relates to arborescent polymers formed from at least one inimer and at least one isoolefin that have been end-functionalized with less than about 5 weight percent end blocks derived from a polymer or copolymer having a high glass transition temperature ($T_g$), and to a process for making such arborescent polymers.

18 Claims, 22 Drawing Sheets

ARBORESCENT POLYMERS AND PROCESS FOR MAKING SAME

CROSS REFERENCE TO RELATED APPLICATION

This application is a continuation application of U.S. Non-Provisional patent application Ser. No. 13/600,687, filed Aug. 31, 2012, pending, which is a continuation of U.S. Non-Provisional patent application Ser. No. 12/439,034, filed on Feb. 26, 2009, (371 requirements completed May 7, 2010), now U.S. Pat. No. 8,258,230, which is a 371 national phase application of International PCT Application No. PCT/US2007/019280, filed Aug. 31, 2007, abandoned, which claims the benefit of U.S. Provisional Application No. 60/841,757, filed Sep. 1, 2006, abandoned, the entirety of all of these applications being incorporated herein by reference.

FIELD OF THE INVENTION

The present invention relates to arborescent polymers and to a process for making same. In one embodiment, the present invention relates to arborescent polymers formed from at least one inimer and at least one isoolefin that have been end-functionalized with a polymer or copolymer having a low glass transition temperature ($T_g$), and to a process for making such arborescent polymers. In another embodiment, the present invention relates to arborescent polymers formed from at least one inimer and at least one isoolefin that have been end-functionalized with less than about 5 weight percent end blocks derived from a polymer or copolymer having a high glass transition temperature ($T_g$), and to a process for making such arborescent polymers. In still another embodiment, the present invention relates to arborescent polymers formed from at least one inimer and at least one isoolefin that have been end-functionalized, where such polymers have a saturated core and one or more unsaturated end-functionalized portions. In still another embodiment, the present invention relates to arborescent polymers that exhibit phase separation even though such polymers would normally fall within the weakly separated or homogeneous portion of a standard polymer phase diagram.

BACKGROUND OF THE INVENTION

Over the last several decades, the development of novel butyl-based elastomers has been limited by the complexity of the methyl chloride (MeCl) slurry process. The current butyl process demands high purity feeds and a diluent (e.g., MeCl), as well as the use of extremely low temperatures (less than −90° C.). The polymerization is very rapid (close to diffusion control) and utilizes a Lewis acid initiator complex with either water or protic activator, further complicating the catalyst makeup and dosing of the reactors. Fouling of the reactors is also a problem in such a slurry process, resulting in reduced production rates caused by the frequent cleaning of the reactors. These factors make the current synthesis of new butyl polymers both costly and unforgiving.

Additionally, it is the extremely high rate of polymerization of isobutene that limits control of the polymerization process and polymer structure. The polymer precipitates from the commercially used diluent, methyl chloride. This prevents any further manipulation of the molecular structure. Very few co-monomers can be incorporated along with isobutylene, and in relatively low concentration as they typically cause rate depression, chain transfer and, in the case of dienes, branching and cyclization. In addition, all co-monomers increase the glass transition temperature ($T_g$), resulting in less desirable low temperature properties.

The present butyl process is 65 year old technology, and the previously mentioned limitations are a few of the main reasons for the development and commercialization of few new grades of butyl-based elastomers during the past 60 years. Furthermore, all of the new butyl-based elastomers, with the exception of star branched regular butyl, are manufactured by post-polymerization modification. This is typically carried out by dissolving the already precipitated base polymer in a hydrocarbon solvent and, following modification, isolating the polymer again via steam coagulation for finishing. Given this process, the production of these new butyl-based elastomers requires a significant amount of energy, and thus production thereof is very inefficient and costly.

Additionally, butyl-type (polyisobutylene-based) polymers find a wide range of uses in such areas as biomedical applications (e.g., stents and implants), tire applications (e.g., innerliners), food-related packaging applications, pharmaceutical closures and in various sealant applications.

As such, there is a need in the art for a process that permits the production of butyl-type polymers having controlled architecture, molecular weight, molecular distribution, branching, co-monomer distribution, and/or co-monomer sequencing, that is accomplished by independent control of the polymerization and initiation steps, as well as control of the overall polymerization rate.

SUMMARY OF THE INVENTION

The present invention relates to arborescent polymers and to a process for making same. In one embodiment, the present invention relates to arborescent polymers formed from at least one inimer and at least one isoolefin that have been end-functionalized with a polymer or copolymer having a low glass transition temperature ($T_g$), and to a process for making such arborescent polymers. In another embodiment, the present invention relates to arborescent polymers formed from at least one inimer and at least one isoolefin that have been end-functionalized with less than about 5 weight percent end blocks derived from a polymer or copolymer having a high glass transition temperature ($T_g$), and to a process for making such arborescent polymers. In still another embodiment, the present invention relates to arborescent polymers formed from at least one inimer and at least one isoolefin that have been end-functionalized, where such polymers have a saturated core and one or more unsaturated end-functionalized portions. In still another embodiment, the present invention relates to arborescent polymers that exhibit phase separation even though such polymers would normally fall within the weakly separated or homogeneous portion of a standard polymer phase diagram.

In one embodiment, the present invention relates to an end-functionalized arborescent polymer comprising: an arborescent elastomeric polymer portion having two or more branching points, the arborescent elastomeric polymer block having a low glass-transition temperature ($T_g$); and one or more end-functionalized portions, wherein one or more end-functionalized portions terminate at least one of the two or more branches of the arborescent elastomeric polymer portion of the end-functionalized arborescent polymer.

In another embodiment, the present invention relates to an end-functionalized arborescent polymer comprising the reaction production of at least one inimer and at least one isoolefin, wherein the end-functionalized arborescent polymer has been end-functionalized with less than about 5 weight percent end blocks derived from a polymer or copolymer having a high glass transition temperature ($T_g$).

In still another embodiment, the present invention relates to an end-functionalized arborescent polymer comprising the reaction production of at least one inimer and at least one isoolefin, where the end-functionalized arborescent polymer has a saturated core and one or more unsaturated end-functionalized portions.

In still another embodiment, the present invention relates to an arborescent polymer comprising the reaction product of at least one inimer and at least one isoolefin, wherein the arborescent polymer exhibits phase separation even though such polymers would normally fall within the homogeneous portion of a standard polymer phase diagram.

In still another embodiment, the present invention relates to an end-functionalized arborescent polymer comprising the reaction product of at least one inimer and at least one isoolefin, wherein the end-functionalized polymer contains from about 0.5 to about 50 weight percent end blocks derived from a polymer or copolymer having a low $T_g$.

In still another embodiment, the present invention relates to an end-functionalized arborescent polymer comprising the reaction product of at least one inimer and at least one isoolefin, wherein the end-functionalized arborescent polymer has been end-functionalized with a low $T_g$ homo or copolymer that contains isoprene or any other cationically polymerizable monomer.

In still another embodiment, the present invention relates to an end-functionalized arborescent polymer comprising the reaction product of at least one inimer and at least one isoolefin, wherein the end-functionalized arborescent polymer further comprises at least one filler.

In still another embodiment, the present invention relates to an end-functionalized arborescent polymer comprising the reaction product of at least one inimer and at least one isoolefin, wherein the end-functionalized arborescent polymer can be crosslinked and/or cured to form a butyl rubber.

In still another embodiment, the present invention relates to an end-functionalized thermoplastic elastomeric arborescent polymer comprising the reaction product of at least one inimer and at least one isoolefin, wherein the end-functionalized thermoplastic elastomeric arborescent polymer are reinforced with one or more fillers and wherein the one or more fillers preferentially interact with the end-functionalized portions of the end-functionalized thermoplastic elastomeric arborescent polymer.

In still another embodiment, the present invention relates to an end-functionalized thermoplastic elastomeric arborescent polymer comprising the reaction product of at least one inimer and at least one isoolefin, wherein the end-functionalized portions of such polymers have a number average molecular weight of less than about 10,000 g/mol.

In still another embodiment, the present invention relates to a method for producing an end-functionalized arborescent polymer composition comprising the steps of: (A) combining at least one inimer compound with at least one isoolefin compound in a suitable solvent to form a inimer/isoolefin mixture; (B) adding to the inimer/isoolefin mixture at least one Lewis acid halide to form a polymerization reaction mixture; (C) causing the polymerization reaction mixture of Step (B) to undergo polymerization to produce a polymer product; (D) subjecting the polymer product to an end-functionalization reaction to yield an end-functionalized polymer product; and (E) recovering the end-functionalized polymer product.

Figure 17:
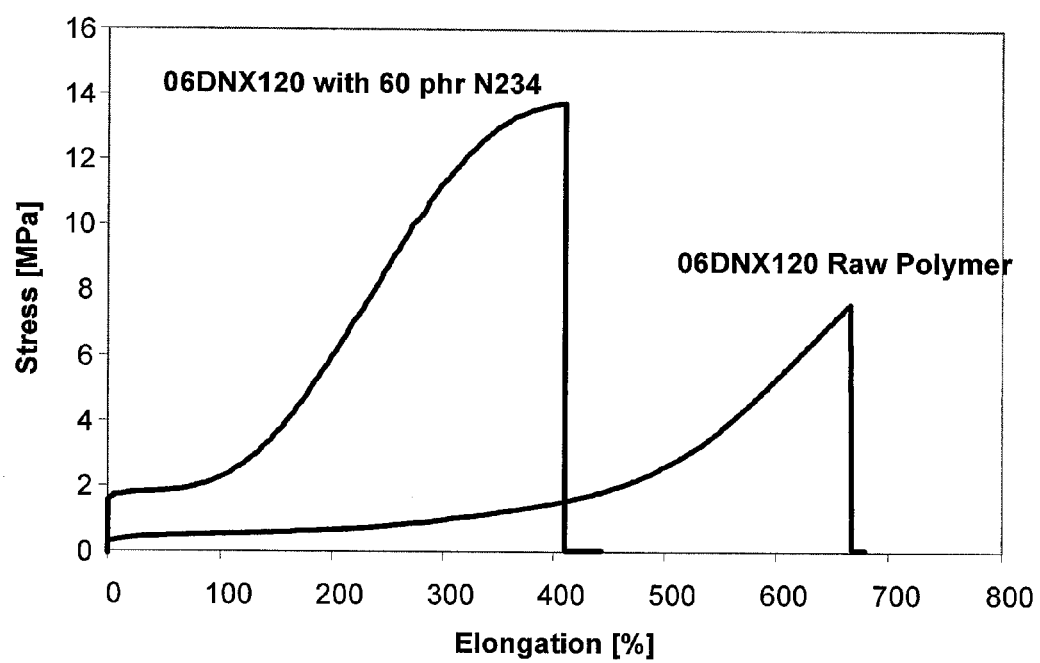
Figure 18:
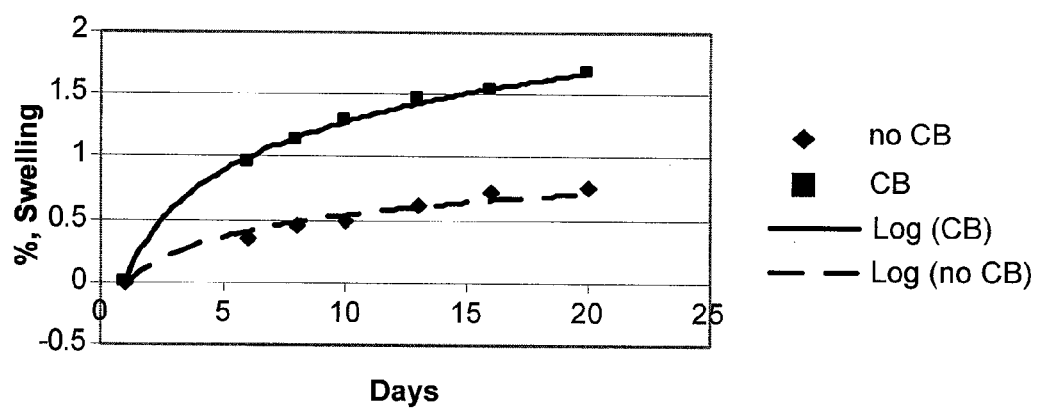
Figure 19:
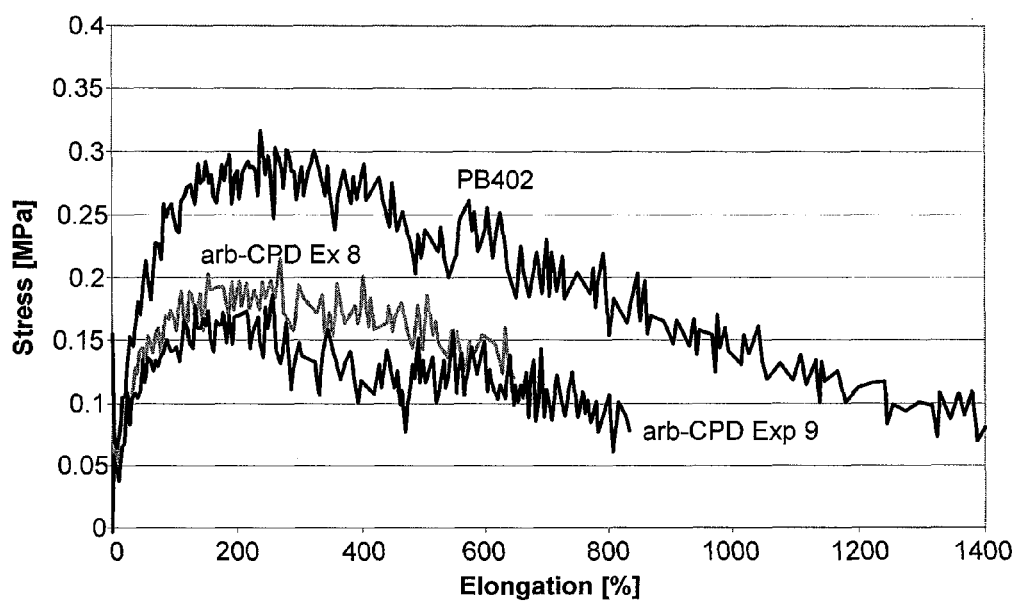
Figure 20:
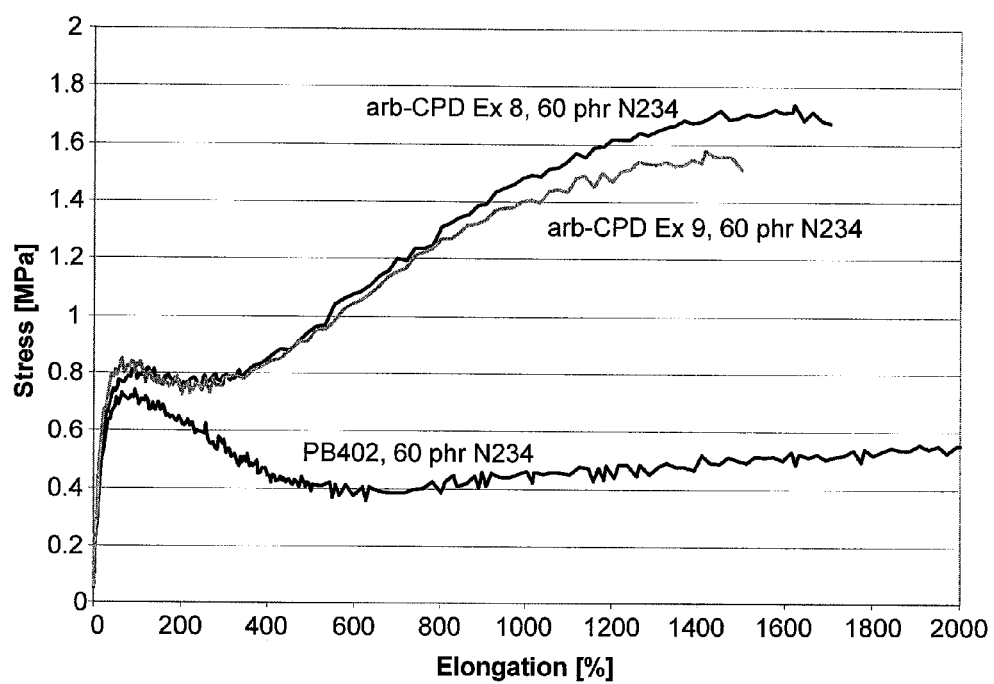
Figure 21A:
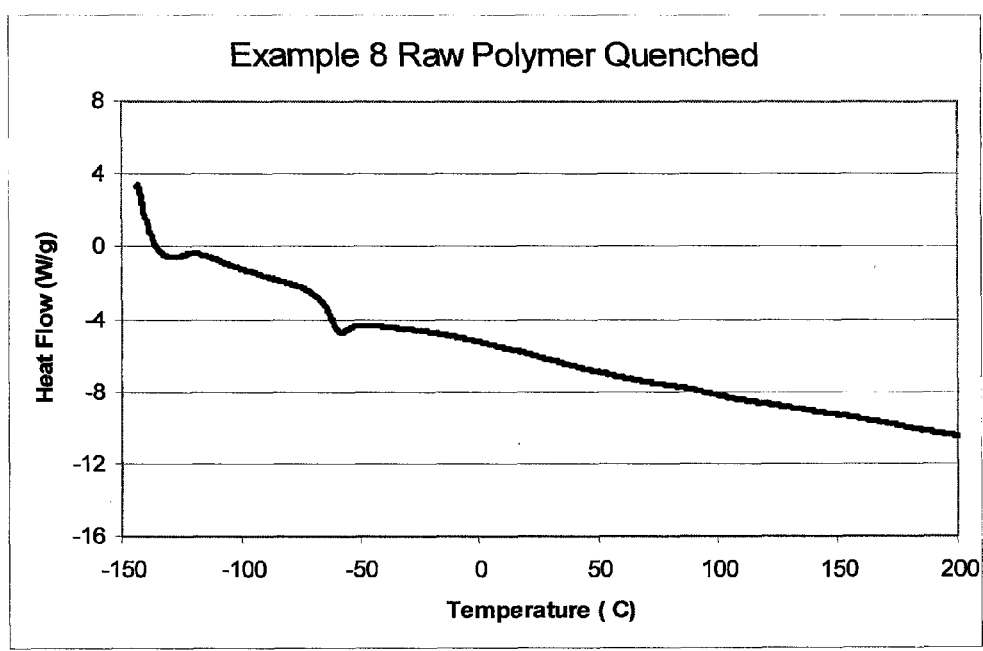
Figure 21B:
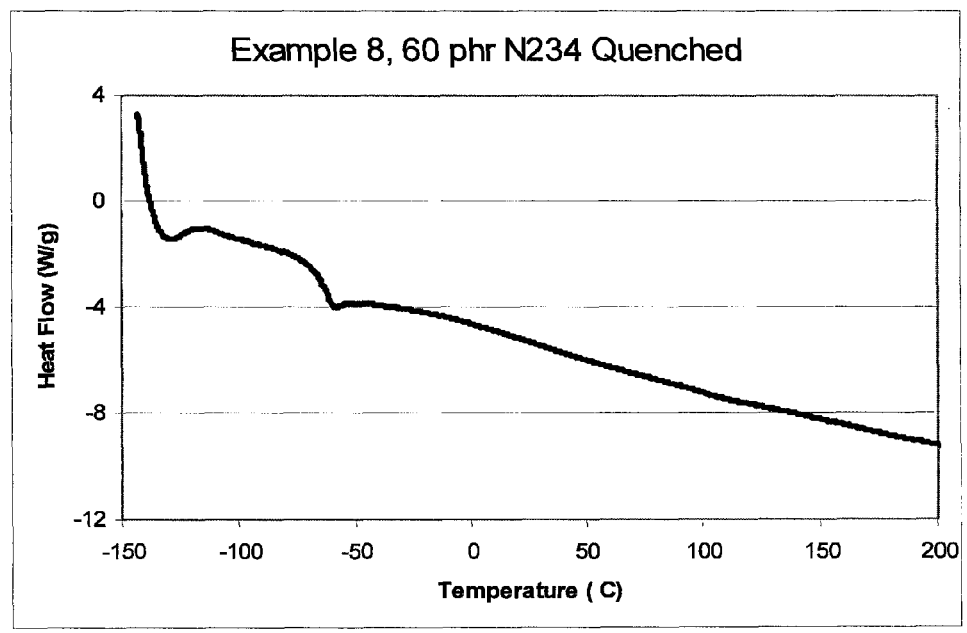

and a raw polymer (06DNX110) formed in accordance with one embodiment of the present invention;

FIG. 17 is a graph depicting plots for stress versus elongation for a polymer according to the present invention with 60 phr N234 carbon black (06DNX110 mixed with 60 phr N234) and a raw polymer (06DNX110) formed in accordance with one embodiment of the present invention;

FIG. 18 is a graph depicting a degradation study comparison a comparison between arbPIB-PMS-OH with and without carbon black;

FIG. 19 is a graph depicting plots for stress versus elongation for raw polymer samples PB402, an arborescent copolymer with 0.4 mol percent CPD formed in accordance with the present invention (Example 8, raw polymer) and an arborescent copolymer with 1.7 mole percent CPD formed in accordance with the present invention (Example 9, raw polymer);

FIG. 20 is a graph depicting plots for stress versus elongation for PB402 with 60 phr N234 carbon black, an arborescent copolymer with 0.4 mole percent CPD formed in accordance with the present invention filled with N234 (Example 8 with 60 phr N234), and the arborescent copolymer with 1.7 mole percent CPD formed in accordance the present invention filled with N234 (Example 9 with 60 phr N234); and FIGS. 21A and 21B are DSC data from an arb-CPD polymer formed in accordance with the present invention (Example 8, raw polymer) and arb-CPD according to the present invention that contains 60 phr carbon black (Example 8 with 60 phr N234).

DETAILED DESCRIPTION OF THE INVENTION

The present invention relates to arborescent polymers and to a process for making same. In one embodiment, the present invention relates to arborescent polymers formed from at least one inimer and at least one isoolefin that have been end-functionalized with a polymer or copolymer having a low glass transition temperature ($T_g$), and to a process for making such arborescent polymers. In another embodiment, the present invention relates to arborescent polymers formed from at least one inimer and at least one isoolefin that have been end-functionalized with less than about 5 weight percent end blocks derived from a polymer or copolymer having a high glass transition temperature ($T_g$), and to a process for making such arborescent polymers. In still another embodiment, the present invention relates to arborescent polymers formed from at least one inimer and at least one isoolefin that have been end-functionalized, where such polymers have a saturated core and one or more unsaturated end-functionalized portions. In still another embodiment, the present invention relates to arborescent polymers that exhibit phase separation even though such polymers would normally fall within the weakly separated or homogeneous portion of a standard polymer phase diagram.

In still another embodiment, the present invention relates to arborescent polymers formed from at least one inimer and at least one isoolefin that have been end-functionalized with about 0.5 to about 50 weight percent end blocks derived from a polymer or copolymer having a low $T_g$. In another instance, polymers according to this embodiment, have from about 1 to about 40 weight percent end-blocks, or about 2 to about 30 weight percent end blocks, or about 3 to about 20 weight percent end blocks, or even from about 1 to about 25 weight percent end blocks. Here, as well as elsewhere in the specification and claims, individual range limits may be combined to form additional ranges.

In yet another embodiment, the present invention relates to arborescent polymers formed from at least one inimer and at least one isoolefin that have been end-functionalized with about 0.5 to about 5 weight percent end blocks derived from a polymer or copolymer having a high glass transition temperature ($T_g$). In another instance, polymers according to this embodiment, have from about 1 to about 4 weight percent end blocks, or even from about 1.5 to about 3.5 weight percent end blocks. In another instance, polymers according to this embodiment, are end-functionalized with styrene or a styrene derivative having a high glass transition temperature.

In still yet embodiment, the present invention relates to arborescent polymers that have one or more end-functionalized portions, or even two or more end-functionalized portions (i.e., branch-like appendages). Regarding the end-functionalized portions, such portions can be formed from the same, similar, or different, or even any combination thereof, end blocks, where such end blocks are derived from a polymer or copolymer having either a high glass transition temperature ($T_g$) or a low glass transition temperature ($T_g$).

In the present invention, a polymer or copolymer having a low glass transition temperature is defined to be a polymer or copolymer having a glass transition temperature of less than about 40° C., or less than about 35° C., or less than about 30° C., or even less than about 25° C. In another embodiment, a polymer or copolymer having a low glass transition temperature is defined to be a polymer or copolymer having a glass transition temperature less than about room temperature (i.e., 25° C.). It should be noted that the previously stated ranges are intended to encompass any polymers and/or copolymers that have a glass transition temperature that falls below one of the previously stated thresholds.

Conversely, a polymer or copolymer having a high glass transition temperature is defined to be a polymer or copolymer having a glass transition temperature of more than about 40° C., or more than about 45° C., or more than about 50° C., or more even more than about 100° C. It should be noted that the previously stated ranges are intended to encompass any polymers and/or copolymers that have a glass transition temperature that falls above one of the previously stated thresholds.

Additionally, in the specification and claims the word polymer is used generically and encompasses regular polymers (i.e., homopolymers) as well as copolymers, block copolymers, random block copolymers and terpolymers.

In still another embodiment, the present invention relates to arborescent polymers formed from at least one inimer and at least one isoolefin that have been end-functionalized with a low $T_g$ homo or copolymer that contains isoprene or any other cationically polymerizable monomer.

In yet another embodiment, the present invention relates to arborescent polymers that have been end-functionalized and further include at least one filler, where such polymers have been formed from at least one inimer and at least one isoolefin. An exemplary reaction scheme for producing polymers according to this embodiment is shown below where each F represents one or more functional end blocks according to the present invention that preferentially interact with one more filler particles.

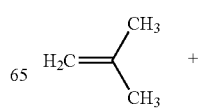

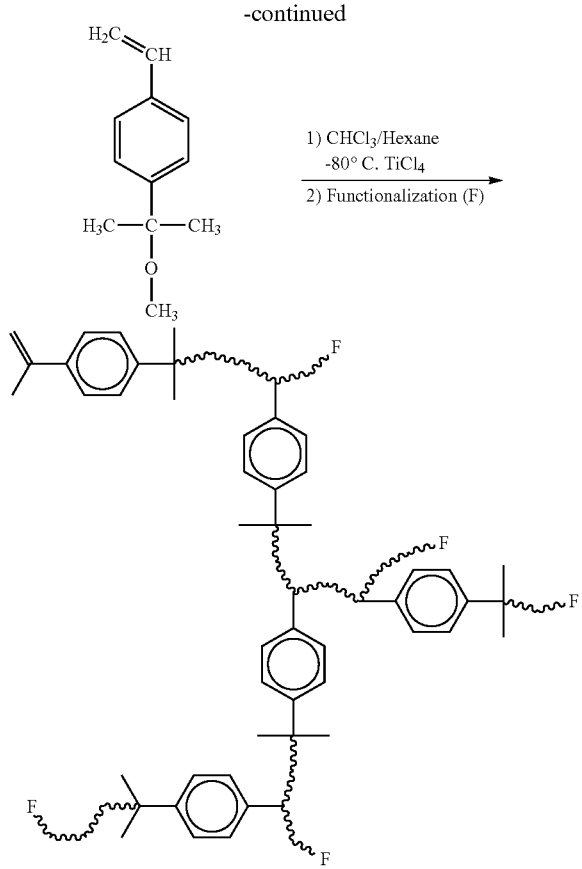

In still another embodiment, the present invention relates to arborescent polymers formed from at least one inimer and at least one isoolefin that have been end-functionalized with a copolymer or homopolymer containing functional groups derived from a diene or diene derivative, or blocks of polydiene and polydiene derivatives. In another instance, the polymers of this embodiment, or other various embodiments disclosed herein, can be subjected to a bromination step.

In still another embodiment, the present invention relates to arborescent polymers formed from at least one inimer and at least one isoolefin that have been end-functionalized with about 0.5 to about 5 weight percent end blocks derived from a styrene or a styrene derivative, or blocks containing polystyrene or its derivatives.

In yet another embodiment, the present invention relates to end-functionalized arborescent polymers where such polymers can be crosslinked and/or cured to form a butyl rubber, where the rubber can optionally contain one or more fillers. In another instance, the polymers of this embodiment can be subjected to a halogenation step (e.g., a bromination or chlorination step).

In yet another embodiment, the present invention relates to end-functionalized thermoplastic elastomeric arborescent polymers that are reinforced with one or more fillers, where the one or more fillers preferentially interact with the end-functionalized portions of such arborescent polymers.

In still another embodiment, the present invention relates to end-functionalized thermoplastic elastomeric arborescent polymers formed from at least one inimer and at least one isoolefin, wherein the end-functionalized portions of such polymers have a number average molecular weight of less than about 10,000 g/mol, less than about 7,500 g/mol, less than about 6,000 g/mol, or even less than about 5,000 g/mol.

Inimers:

Initially, self-condensing monomers combine features of a monomer and an initiator and the term "inimer" (IM) is used describe such compounds. If a small amount of a suitable inimer is copolymerized with, for example, isobutylene, arborescent polyisobutylenes can be synthesized. Formula (I) below details the nature of the inimer compounds that can be used in conjunction with the present invention. In Formula (I) A represents the polymerizable portion of the inimer compound, while B represents the initiator portion of the inimer compound.

$$A\text{-}B \tag{I}$$

where A is

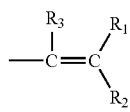

where B is

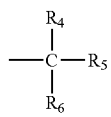

In Formula (I), $R_1$, $R_2$, $R_3$, $R_4$, $R_5$ and $R_6$ are each, in one embodiment, independently selected from hydrogen, linear or branched $C_1$ to $C_{10}$ alkyl, or $C_5$ to $C_8$ aryl. In another embodiment, $R_1$, $R_2$, and $R_3$ are all hydrogen. In another embodiment, $R_4$, $R_5$ and $R_6$ are each independently selected from hydrogen, hydroxyl, bromine, chlorine, fluorine, iodine, ester (—O—C(O)—$R_7$), peroxide (—OO$R_7$), and —O—$R_7$ (e.g., —OCH$_3$ or —OCH$_2$=CH$_3$). With regard to $R_7$, $R_7$ is an unsubstituted linear or branched $C_1$ to $C_{20}$ alkyl, an unsubstituted linear or branched $C_1$ to $C_{10}$ alkyl, a substituted linear or branched $C_1$ to $C_{20}$ alkyl, a substituted linear or branched $C_1$ to $C_{10}$ alkyl, an aryl group having from 2 to about 20 carbon atoms, an aryl group having from 9 to 15 carbon atoms, a substituted aryl group having from 2 to about 20 carbon atoms, a substituted aryl group having from 9 to 15 carbon atoms. In one embodiment, where one of $R_4$, $R_5$ and $R_6$ either a chlorine or fluorine, the remaining two of $R_4$, $R_5$ and $R_6$ are independently selected from an unsubstituted linear or branched $C_1$ to $C_{20}$ alkyl, an unsubstituted linear or branched $C_1$ to $C_{10}$ alkyl, a substituted linear or branched $C_1$ to $C_{20}$ alkyl, a substituted linear or branched $C_1$ to $C_{10}$ alkyl. In still another embodiment, any two of $R_4$, $R_5$ and $R_6$ can together form an epoxide.

In one embodiment, portions A and B of inimer compound (I) are joined to one another via a benzene ring. In one instance, portion A of inimer compound (I) is located at the 1 position of the benzene ring while portion B is located at either the 3 or 4 position of the benzene ring. In another embodiment, portions A and B of inimer compound (I) are joined to one another via the linkage shown below in Formula (II):

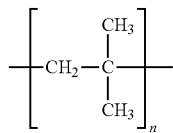

where n is an integer in the range of 1 to about 12, or from 1 to about 6, or even from 1 to about 3. In another embodiment, n is equal to 1 or 2.

In another embodiment, for isobutylene polymerization B can be a tertiary ether, tertiary chloride, tertiary methoxy group or tertiary ester. Very high molecular weight arborescent PIBs can be synthesized using the process of the present invention with inimers such as 4-(2-hydroxy-isopropyl)styrene and 4-(2-methoxy-isopropyl)styrene.

Exemplary inimers for use in conjunction with the present invention include, but are not limited to, 4-(2-hydroxyisopropyl)styrene, 4-(2-methoxyisopropyl)styrene, 4-(1-methoxyisopropyl)styrene, 4-(2-chloroisopropyl)styrene, 4-(2-acetoxyisopropyl)styrene, 2,3,5,6-tetramethyl-4-(2-hydroxy isopropyl)styrene, 3-(2-methoxyisopropyl)styrene, 4-(epoxyisopropyl)styrene, 4,4,6-trimethyl-6-hydroxyl-1-heptene, 4,4,6-trimethyl-6-chloro-1-heptene, 4,4,6-trimethyl-6,7-epoxy-1-heptene, 4,4,6,6,8-pentamethyl-8-hydroxyl-1-nonene, 4,4,6,6,8-pentamethyl-8-chloro-1-nonene, 4,4,6,6,8-pentamethyl-8,9-epoxy-1-nonene, 3,3,5-trimethyl-5-hydroxyl-1-hexene, 3,3,5-trimethyl-5-chloro-1-hexene, 3,3,5-trimethyl-5-6-epoxy-1-hexene, 3,3,5,5,7-pentamethyl-7-hydroxyl-1-octene, 3,3,5,5,7-pentamethyl-7-chloro-1-octene, or 3,3,5,5,7-pentamethyl-7,8-epoxy-1-octene. In one embodiment, the inimer of the present invention is selected from 4-(2-methoxyisopropyl)styrene or 4-(epoxyisopropyl)styrene.

In still another embodiment, the inimer utilized in conjunction with the present invention has a formula according to one of those shown below:

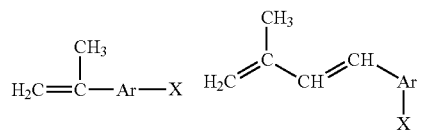

wherein X corresponds to a functional organic group from the series —$CR^1_2Y$, where Y represents OR, Cl, Br, I, CN, $N_3$ or SCN and $R^1$ represents H and/or a $C_1$ to $C_{20}$ alkyl, and Ar represents $C_6H_4$ or $C_{10}H_8$.

Isoolefin:

Formula (III) details the nature of the isoolefin compounds that can be used in conjunction with the present invention.

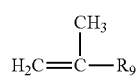

(III)

where $R_9$ is $C_1$ to $C_4$ alkyl group such as methyl, ethyl or propyl. In one embodiment, the compound according to Formula (III) is isobutylene (i.e., isobutene) or 2-methyl-1-butene.

In one embodiment, 4-(2-methoxyisopropyl)styrene or 4-(epoxyisopropyl)styrene is used as the inimer and isobutylene as the isoolefin, as will be described in detail below, to yield an arborescent polymer as shown below in Scheme 1.

Scheme 1

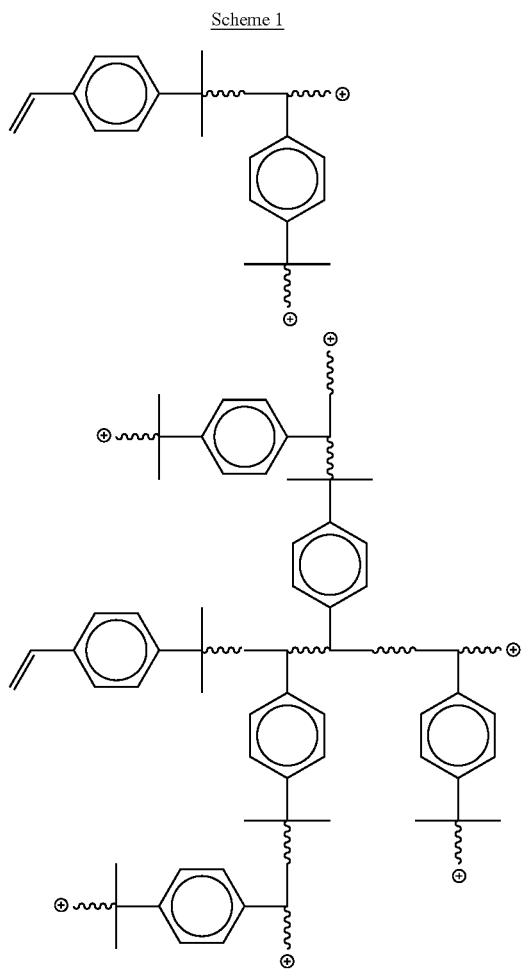

Using the process of the present invention, the structure of arborescent polymers (e.g., arborescent polyisobutylenes) can be varied within a wide range. For example, arborescent polymers according to the present invention can be controlled via the molar ratios of inimer and monomer (e.g., isobutylene) added to the polymerization charge. For example, decreasing the concentration of inimer relative to the concentration of isobutylene monomer in the feed will result in longer chains with reduced degrees of branching. Conversely, increasing the concentration of inimer relative to the amount of isobutylene leads to the formation of a polymer with a highly branched structure having shorter arm lengths. Scheme 1 above illustrates the result of these two scenarios. Further alteration of the arborescent core can be achieved by the sequential addition of inimer and/or monomer throughout the polymerization process. For example a "pom-pom"-like polymer architecture results by first making a structure shown on the left side of Scheme 1 followed by the sequential addition of both inimer and monomer.

Distinct changes in the rheological properties of a polymer formed in accordance with the present invention are made possible by changes in the chain architecture. Arborescent polyisobutylenes (PIB) formed in accordance with the present invention have reduced shear sensitivity due to the branched structure, and reduced viscosity compared to linear polymers of equivalent chain length. More specifically, the use of arborescent PIBs in rubber compound formulations have been shown to produce materials with increased green strength, reduced cold flow, and reduced die swell.

In another embodiment, the arborescent polymers of the present invention can be functionalized with co-monomers which can provide useful chemical properties to the PIB template. For example, the main PIB backbone can be synthesized and then the addition of the co-monomer at the later stages of the polymerization can provide end blocks on the growing arms of the macromolecule. Scheme 2 below represents a functionalized arborescent polymer made in accordance with the present invention, as will be detailed below.

butadiene-1,3; 2-methylbutadiene-1,3; 2,4-dimethylbutadiene-1,3; piperyline; 3-methylpentadiene-1,3; hexadiene-2,4; 2-neopentylbutadiene-1,3; 2-methlyhexadiene-1,5; 2,5-dimegyhexadiene-2,4; 2-methylpentadiene-1,4; 2-methylheptadiene-1,6; cyclopentadiene; methylcyclopentadiene; cyclohexadiene; 1-vinyl-cyclohexadiene; or mixtures of two or more thereof), norbornadiene, and β-pinene.

Among the advantages made possible by the process of the present invention is the ability to produce butyl-based polymer compounds that possess increased filler affinity, have improved processability characteristics, are able to be injec- Scheme 2

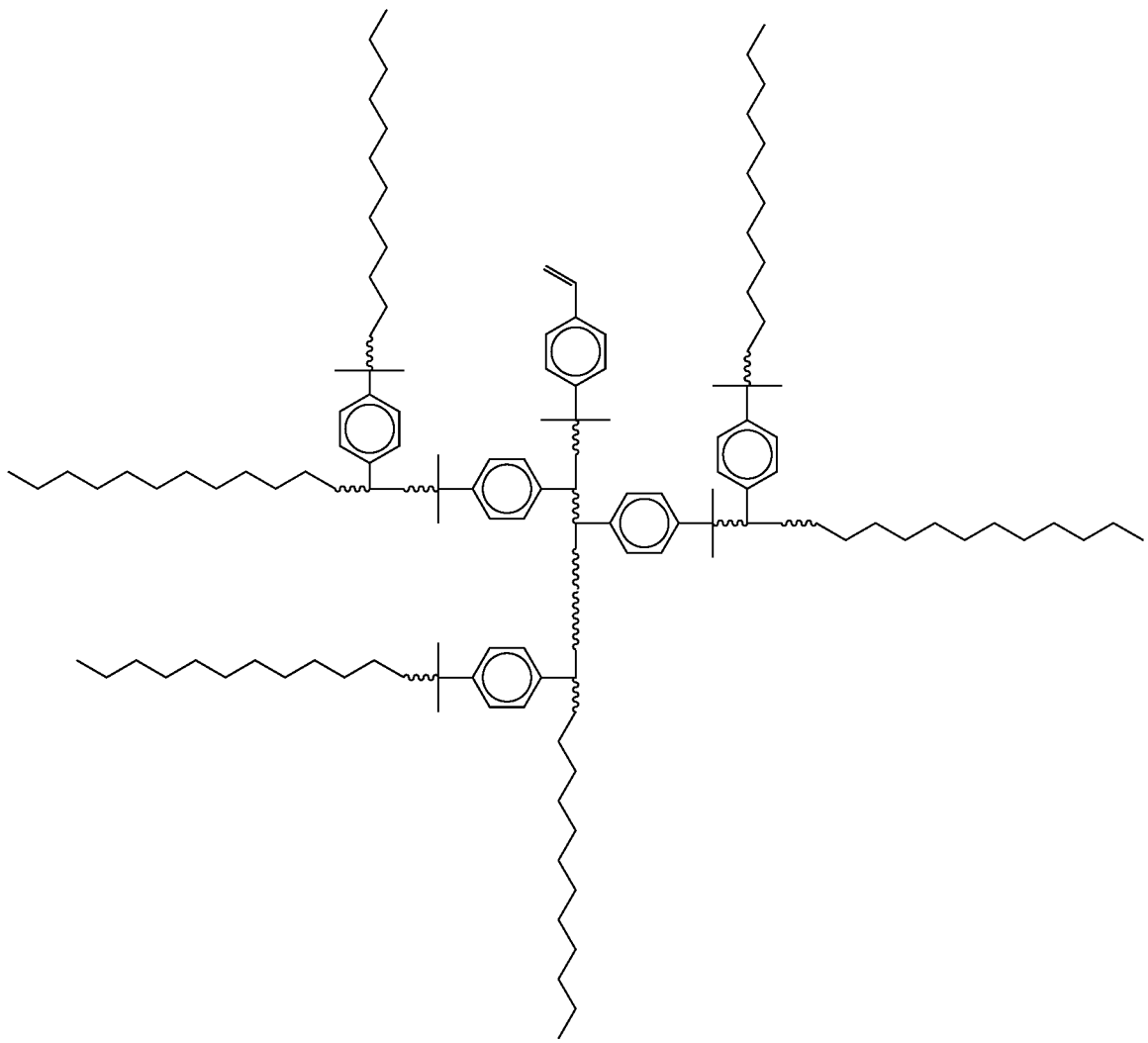

In Scheme 2, the saw-tooth portions represent the functionalization of the arborescent polymer shown on the right side of Scheme 1.

In the present invention, the end-functionalized portion of the polymers disclosed herein can be derived, according to the embodiments detailed above, from any suitable low or high glass transition polymer. Suitable polymers for accomplishing the end-functionalization of the present invention include, but are not limited to, homo or copolymer of styrene or styrene derivatives, including indene and its derivatives, diene or triene (conjugated or other dienes such as isoprene, tion molded (due in part to lower viscosities); increased tolerance to peroxide-based curing, have a high degree of unsaturation, and permit high temperature production of butyl-based polymer compounds (e.g., at a temperature of about −40° C.).

In one embodiment, the process according to the present invention is carried out in an inert organic solvent or solvent mixture in order that the polyisoolefin and the final polymer product remain in solution. At the same time, the solvent also provides a degree of polarity so that the polymerization process can proceed at a reasonable rate. Suitable solvents include single solvents such as n-butyl chloride. In another embodiment, a mixture of a non-polar solvent and a polar solvent can be used. Suitable non-polar solvents include, but are not limited to, hexane, methylcyclohexane and cyclohexene. Suitable polar solvents include, but are not limited to, ethyl chloride, methyl chloride and methylene chloride. In one embodiment, the solvent mixture is a combination of methylcyclohexane and methyl chloride, or even hexane and methyl chloride. To achieve suitable solubility and polarity it has been found that the ratio of the non-polar solvent to the polar solvent on a weight basis should be from about 80:20 to about 40:60, from about 75:25 to about 45:55, from about 70:30 to about 50:50, or even about 60:40. Again, here, as well as elsewhere in the specification and claims, individual range limits may be combined.

The temperature range within which the process is carried out is from about −20° C. to about −100° C., or from about −30° C. to about −90° C., or from about −40° C. to about −85° C., or even from about −50° C. to about −80° C. The process of the present invention is, in one embodiment, carried out using an about 1 to about 30 percent polyisoolefin solution (weight/weight basis), or even from about 5 to about 10 weight percent polyisoolefin solution.

In order to produce the arborescent polymers of the present invention it is, in one embodiment, necessary to use a co-initiator (e.g., a Lewis acid halide). Suitable Lewis acid halides include, but are not limited to, $BCl_3$, $BF_3$, $AlCl_3$, $SnCl_4$, $TiCl_4$, $SbF_5$, $SeCl_3$, $ZnCl_2$, $FeCl_3$, $VCl_4$, $AlR_nCl_{3-n}$, wherein R is an alkyl group and n is less than 3, and mixtures thereof. In one embodiment, titanium tetrachloride ($TiCl_4$) is used as the co-initiator.

The branched block copolymers of the present invention can also be produced in a one-step process wherein the isoolefin is co-polymerized with the initiator monomer in conjunction with the co-initiator in a solution at a temperature of from about −20° C. to about −100° C., or from about −30° C. to about −90° C., or from about −40° C. to about −85° C., or even from about −50° C. to about −80° C. An electron donor and a proton trap are introduced, followed by the addition of a pre-chilled solution of the co-initiator in a non-polar solvent (e.g., hexane). The polymerization is allowed to continue until it is terminated by the addition of a nucleophile such as methanol.

In some embodiments, production of arborescent polymers in accordance with the present invention necessitates the use of additives such as electron pair donors to improve blocking efficiency and proton traps to minimize homopolymerization. Examples of suitable electron pair donors are those nucleophiles that have an electron donor number of at least 15 and no more than 50 as tabulated by Viktor Gutmann in *The Donor Acceptor Approach to Molecular Interactions*, Plenum Press (1978) and include, but are not limited to, ethyl acetate, dimethylacetamide, dimethylformamide and dimethyl sulphoxide. Suitable proton traps include, but are not limited to, 2,6-ditertiarybutylpyridine, 4-methyl-2,6-ditertiarybutylpyridine and diisopropylethylamine.

In another embodiment, the arborescent polymers of the present invention can also contain one or more fillers. Suitable fillers include, but are not limited to, carbon black, silica, starch, clays, nanoclays, carbon nanotubes, other silicon based fillers, etc. In the case where one or more fillers are utilized in conjunction with the present invention, the filler can be bound, attached, captured and/or entrained by the end-functionalized portion of the arborescent polymers of the present invention rather than by the core portion thereof (e.g., the polyisobutylene portion).

In yet another embodiment, the present invention provides a rubber composition comprising at least one, optionally halogenated, arborescent polymer, at least one filler and at least one vulcanizing agent. In order to provide a vulcanizable rubber compound, at least one vulcanizing agent or curing system has to be added. The present invention is not limited to any one type of curing system. An exemplary curing system is a sulfur curing system. In such an instance, the amount of sulfur utilized in the curing process can be in the range of from about 0.3 to about 2.0 phr (parts by weight per hundred parts of rubber). An activator, for example zinc oxide, can also be used. If present, the amount of activator ranges from about 0.5 parts to about 5 parts by weight.

Other ingredients, for instance stearic acid, oils (e.g., Sunpar® of Sunoco), antioxidants, or accelerators (e.g., a sulfur compound such as dibenzothiazyldisulfide (e.g., Vulkacit® DM/C of Bayer AG) can also be added to the compound prior to curing. Curing (e.g., sulfur-based cure) is then effected in a known manner. See, for instance, Chapter 2, *The Compounding and Vulcanization of Rubber*, in *Rubber Technology*, Third Edition, Chapman & Hall, 1995. This publication is hereby incorporated by reference for its teachings relating to cure systems.

The vulcanizable rubber compound according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc. Such compounds, additives, and/or products are known in/to the rubber industry. The rubber aids are used in conventional amounts, which depend on the intended use. Conventional amounts are, for example, from about 0.1 to about 50 phr. In one embodiment, the vulcanizable compound comprising a solution blend further comprises in the range of about 0.1 to about 20 phr of one or more organic fatty acids as an auxiliary product. In one embodiment, the unsaturated fatty acid has one, two or more carbon double bonds in the molecule which can include about 10% by weight or more of a conjugated diene acid having at least one conjugated carbon-carbon double bond in its molecule. In another embodiment, the fatty acids used in conjunction with the present invention have from about 8 to about 22 carbon atoms, or even from about 12 to about 18 carbon atoms. Suitable examples include, but are not limited to, stearic acid, palmitic acid and oleic acid and their calcium-, zinc-, potassium-, magnesium- and ammonium salts. Furthermore up to about 40 parts of processing oil, or even from about 5 to about 20 parts of processing oil, per hundred parts of elastomer, can be present.

It may be advantageous to further add silica modifying silanes, which give enhanced physical properties to silica or silicious filler containing compounds. Compounds of this type possess a reactive silylether functionality (for reaction with the silica surface) and a rubber-specific functional group. Examples of these modifiers include, but are not limited to, bis(triethoxysilylpropyl)tetrasulfane, bis(triethoxysilylpropyl)disulfane, or thiopropionic acid S-triethoxylsilylmethyl ester. The amount of silica modifying silane is in the range of from about 0.5 to about 15 parts per hundred parts of elastomer, or from about 1 to about 10, or even from about 2 to about 8 parts per hundred parts of elastomers. The silica modifying silane can be used alone or in conjunction with other substances which serve to modify the silica surface chemistry.

The ingredients of the final vulcanizable rubber compound comprising the rubber compound are often mixed together, suitably at an elevated temperature that can range from about 25° C. to about 200° C. Normally the mixing time does not exceed one hour and a time in the range from about 2 to about 30 minutes is usually adequate. Mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. For compounding and vulcanization see also: *Encyclopedia of Polymer Science and Engineering*, Volume 4, p. 66 et seq. (Compounding) and Volume 17, p. 666 et seq. (Vulcanization). This publication is hereby incorporated by reference for its teachings relating to compounding and vulcanization.

In still another embodiment, in the case where the arborescent polymers of the present invention are end-functionalized, the core portion (e.g., the polyisobutylene portion) has no curable sites, whereas the end-functionalized portion in this embodiment can have one or more curable sites. This permits, among other things, for such arborescent polymers to undergo peroxide cure without causing damage to the overall arborescent polymer structure. Also possible, in such instances, are the use of other cure systems such as sulfur-based cure systems to obtain a cured composition in accordance with the present invention.

The number average molecular weight ($M_n$) polymers of the present invention range from about 500 g/mol to about 2,000,000 g/mol; or from about 1,000 g/mol to about 1,500,000 g/mol; or from about 10,000 g/mol to about 1,000,000 g/mol; or from about 20,000 g/mol to about 500,000 g/mol; or from about 50,000 g/mol to about 400,000 g/mol; or from about 70,000 g/mol to about 300,000 g/mol; or even from about 80,000 g/mol to about 295,000 g/mol. In another embodiment, the number average molecular weight ($M_n$) polymers of the present invention range from about 20,000 g/mol to about 300,000 g/mol. Again, here, as well as elsewhere in the specification and claims, individual range limits may be combined.

In one embodiment, the polymers of the present invention have a narrow molecular weight distribution such that the ratio of weight average molecular weight to number average molecular weight ($M_w/M_n$) is in the range of about 1.0 to about 4.5, or from about 1.1 to about 4.0, or from about 1.2 to about 3.5, or from about 1.3 to about 3.0, or from about 1.4 to about 2.5, or even from about 1.5 to about 2.0. In another embodiment, the polymers of the present invention have a narrow molecular weight distribution such that the ratio of weight average molecular weight to number average molecular weight ($M_w/M_n$) is in the range of 1.6 to about 2.4, or from about 1.7 to about 2.3, or from about 1.8 to about 2.2, or from about 1.9 to about 2.1, or even from about 1.5 to about 1.9.

EXAMPLES

The following examples are descriptions of methods within the scope of the present invention, and use of certain compositions of the present invention as described in detail above. The following examples fall within the scope of, and serve to exemplify, the more generally described compositions, formulations and processes set forth above. As such, the examples are not meant to limit in any way the scope of the present invention.

Butyl polymers containing an arborescent butyl core and chemically curable end-sequences are prepared as will be discussed in detail below. All polymerizations are carried out in an MBraun MB 15OB-G-I dry box.

Chemicals:

4-(2-methoxy-isopropyl)styrene (p-methoxycumyl styrene, pMeOCumSt) is synthesized, while isobutylene and methyl chloride are used without further purification from a suitable production unit. Isoprene (IP, 99.9% and available from Aldrich) is passed through a p-tert-butylcatechol inhibitor remover column prior to usage.

Test Methods:

The molecular weight and molecular weight distributions of the polymers are determined by size exclusion chromatography (SEC). The system consists of a Waters 515 HPLC pump, a Waters 2487 Dual Absorbance Detector, a Wyatt Optilab Dsp Interferometric Refractometer, a Wyatt DAWN EOS multi-angle light scattering detector, a Wyatt Viscostar viscometer, a Wyatt QELS quasi-elastic light scattering instrument, a 717plus autosampler and 6 Styragel® columns (HR1/2, HR1, HR3, HR4, HR5 and H6). The RI detector and the columns are thermostated at 35° C. and THF freshly distilled from $CaH_2$ is used as the mobile phase at a flow rate of 1 ml/min. The results are analyzed using ASTRA software (Wyatt Technology). Molecular weight calculation is carried out using 100% mass recovery as well as 0.108 cm$^3$/g dn/dc value.

HNMR measurements are conducted using a Bruker Avance 500 instrument and deuterated chloroform or THF as the solvent. Raw polymer Mooney measurements are conducted at 125° C. using a MV 2000 rotational viscometer manufactured by Alpha Technology. Mixing with carbon black is accomplished using a 75 cm$^3$ Banbury type Brabender mixer.

Dynamic properties of all the samples are determined in compression using Gabo Eplexor 150N. Test conditions: static strain: 5%; max force: 20N; dynamic strain: 2%; max force: 10N; frequency: 10 Hz; heating rate: 2° C./min; and load between measurements: preload. Stress strain measurements are done at 23° C. using 500 mm/min crosshead speed on an Instron Model 1122 instrument.

In Example 1, inimer is added at a concentration of $1.14 \times 10^{-3}$ mol/dm$^3$. In Example 2, inimer is added at a concentration of $2.27 \times 10^{-3}$ mol/dm$^3$.

Example 1

06DNX001

Polymerization is carried out in a 3 dm$^3$ round shape baffled glass reactor. The reactor is equipped with a glass stirrer rod (mounted with a crescent shaped Teflon impeller) and a thermocouple. To the reactor are added 0.35 grams of pMeOCumSt, 900 cm$^3$ hexane (measured at room temperature), 600 cm$^3$ methyl chloride (measured at −95° C.), 2 cm$^3$ di-tert-butylpyridine (measured at room temperature) and 240 cm$^3$ isobutylene (measured at −95° C.). Polymerization is started at −95° C. by addition of a pre-chilled mixture of 6 cm$^3$ TiCl$_4$ and 20 cm$^3$ hexane (both measured at room temperature). After 120 minutes of polymerization, a mixture of 236 cm$^3$ isoprene (measured at room temperature), 150 cm$^3$ methyl chloride (measured at −95° C.) and 0.5 cm$^3$ di-tert-butylpyridine (measured at room temperature) is added. Upon the addition of the isoprene charge, the viscous solution turns into a two phase system. The solution is brought back to a viscous solution by the addition of 150 cm$^3$ hexane (measured at room temperature and cooled to −95° C.) at 130 minutes. At 135 minutes a pre-chilled mixture of 3 cm³ TiCl₄ and 20 cm³ hexane (both measured at room temperature) is added. Polymerization is terminated at 150 minutes by the addition of 125 cm³ methanol containing 11 grams of NaOH. During the polymerization, samples are taken using a cold pipette and discharged into test tubes containing 10 cm³ of methanol.

After the evaporation of methyl chloride, hexane is added to the polymer solution and the solution is washed neutral with water. The polymer product is isolated with steam coagulation and dried on a hot mill to a constant weight. The dried weight of the polymer is 164.7 grams.

During polymerization, samples are withdrawn from the charge using a cold pipette at different times and injected into vials containing methanol. The molecular weights of these samples are measured to illustrate the increase in molecular weight during polymerization. The characteristics of various samples taken at different time intervals are noted in Table 1.

TABLE 1

| Sample | Reaction Time | dn/dc | $M_n$ (g/mol) | $M_w$ (g/mol) | $M_z$ (g/mol) | $M_w/M_n$ |
|---|---|---|---|---|---|---|
| 06DNX001-1 | 10 | 0.098 | 70,300 | 82,700 | 101,300 | 1.18 |
| 06DNX001-2 | 20 | 0.107 | 94,400 | 145,300 | 471,400 | 1.54 |
| 06DNX001-3 | 40 | 0.114 | 175,700 | 292,200 | 551,000 | 1.66 |
| 06DNX001-4 | 80 | 0.108 | 267,300 | 536,300 | 1,152,000 | 2.01 |
| 06DNX001-5 | 115 | 0.114 | 246,800 | 562,700 | 1,301,000 | 2.28 |
| 06DNX001-6 | 132 | 0.109 | 288,200 | 662,600 | 1,567,000 | 2.30 |
| 06DNX001-7 | 150 | 0.11 | 295,000 | 717,800 | 1,778,000 | 2.43 |

In Table 1, the time column indicates the time at which samples for testing are withdrawn from the above described polymerization reaction.

HNMR analysis indicated that the amount of isoprene incorporated into the polymer is 0.7 mole percent. The Mooney viscosity of the finished product is determined to be 41.6 (1+8@125° C.).

Figure 1:
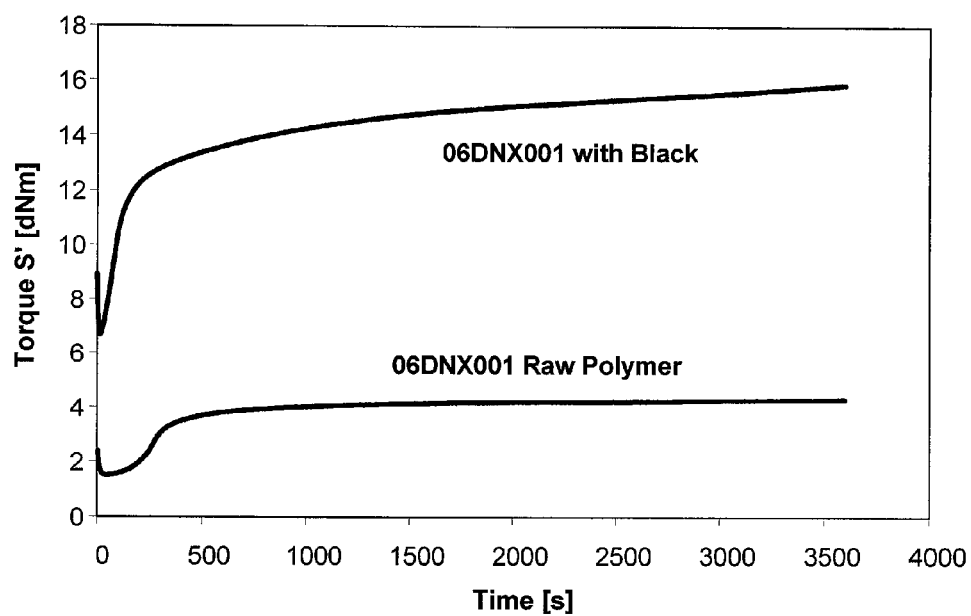
FIG. 1 is a graph depicting torque curves of a raw polymer (06DNX001 RP) in accordance with the present invention and a filled polymer (06DNX001 with carbon black) in accordance with the present invention.

The cure activity of the sample is determined in the absence and presence of carbon black. Tables 2 and 3 below show the formulations used in parts per hundred parts of rubber. The cure is measured at 166° C. using an MDR made by Alpha Technology. The test conditions are: 1° arc, 1.7 Hz. FIG. 1 shows a comparison between the torque curves of the raw polymer (06DNX001 RP) and a filled polymer (06DNX001 with carbon black).

TABLE 2

| Polymer | 100 |
|---|---|
| Stearic Acid | 1 |
| Sulfur NBS | 1.5 |
| Vulkacit Merkapto MG/C (MBT) | 0.5 |
| Vulkacit Thiuram/C (D) | 1 |
| Zinc Oxide | 5 |

TABLE 3

| Polymer | 100 |
|---|---|
| N234 | 60 |
| Stearic Acid | 1 |
| Sulfur NBS | 1.5 |
| Vulkacit Merkapto MG/C (MBT) | 0.5 |
| Vulkacit Thiuram/C (D) | 1 |
| Zinc Oxide | 5 |

Figure 2:
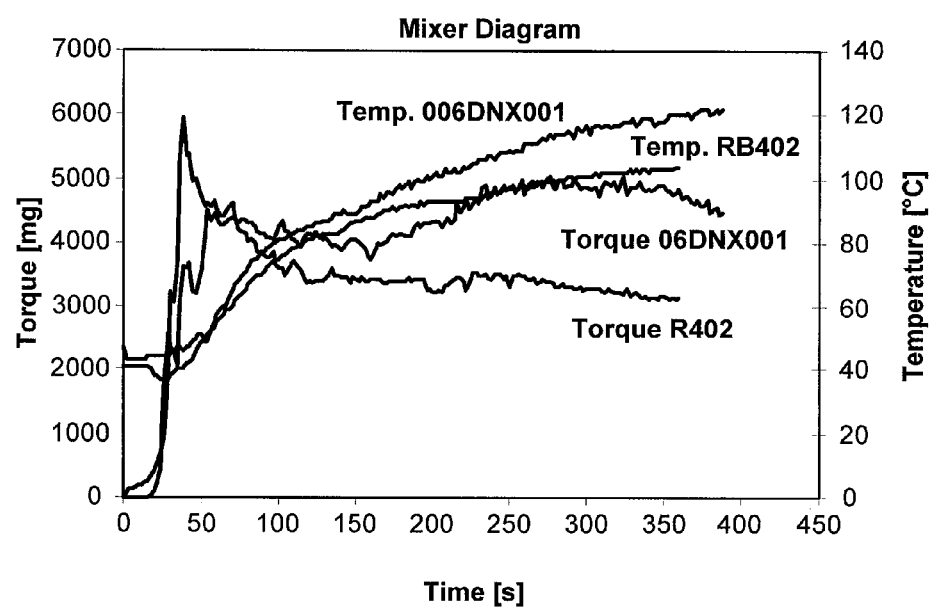
FIG. 2 is a graph depicting the torque and temperature increases during mixing for an arborescent polymer of the present invention (06DNX001) and a commercial grade butyl (RB402)

Next raw 06DNX001 polymer is mixed with 60 phr N234 carbon black in a Banbury type Brabender mixer using a 78.8% fill factor. The torque development and temperature increase during mixing is significantly more pronounced than with typical and/or regular butyl compositions. FIG. 2 is a graph depicting the torque and temperature increases during mixing for an arborescent polymer of the present invention (06DNX001) and a commercial grade butyl (RB402). Maximum temperature, torque and specific energy of the samples prepared in accordance with the present invention are higher than that of the linear samples at the same or even at a lower raw polymer Mooney viscosity. The torque of the arborescent sample formed in accordance with the present invention also shows a distinctive second peak as illustrated by FIG. 2. This is an indication of improved filler dispersion (see N. Tokita and I. Pliskin, *Rubber Chem. & Technol.*, 46, 1166 (1973)). Butyl rubber is known to mix poorly with carbon black. Typically, such a butyl rubber does not have a distinctive second torque peak or such a peak is very ill defined. Tokita divided a torque curve into three regions (see N. Tokita and I. Pliskin, *Rubber Chew. & Technol.*, 46, 1166 (1973)). The first is the filler wetting region located between the filler addition and the minimum of the power curve, and the second is the dispersion region located between the minimum of the power curve and just over the second power peak. This region is followed by the mastication region. Generally speaking, the higher the second torque peak the better the filler dispersion. According to Tokita, improved filler dispersion is expected to result in a lower Mooney viscosity, higher die swell and mill shrinkage.

Figure 3:
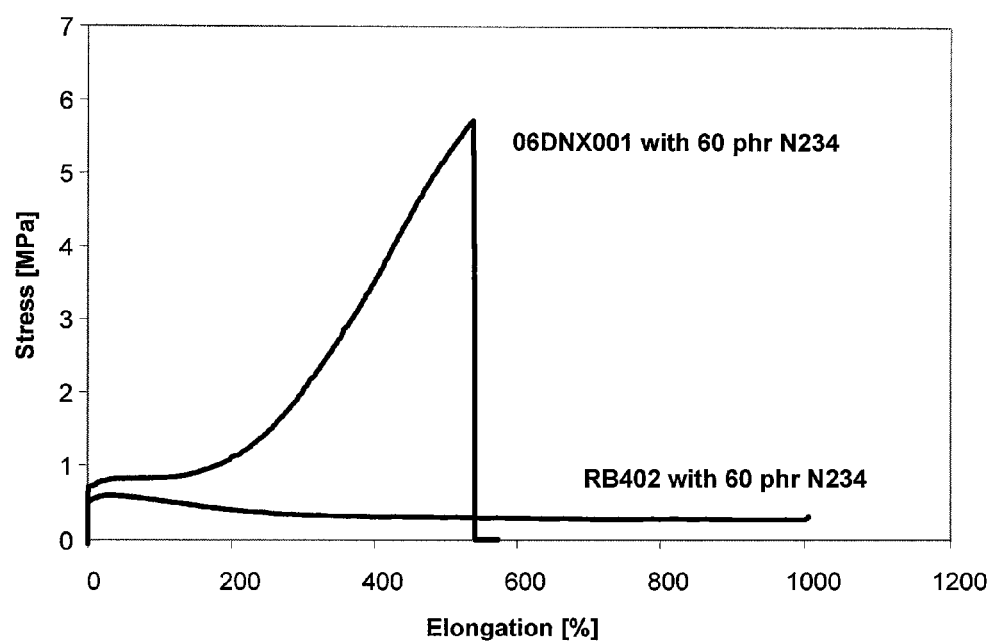
FIG. 3 is a graph depicting plots for stress versus elongation for a green polymer according to the present invention with 60 phr N234 carbon black (06DNX001 with 60 phr N234) and a green regular grade butyl with 60 phr N234 carbon black (RB402 with 60 phr N234)

The sheeted out black mix shows unexpected strength at room temperature indicating a strong reinforcement uncharacteristic to regular butyl polymers. This is illustrated by the stress strain curves of the carbon black mixes obtained using macro dumbbells cut out from molded macro sheets. The molding is done at 160° C. FIG. 3 is a graph depicting plots for stress versus elongation for a green polymer according to the present invention with 60 phr N234 carbon black (06DNX001 with 60 phr N234) and a green regular grade butyl with 60 phr N234 carbon black (RB402 with 60 phr N234).

For comparison purposes the stress strain curve of the RB402 compound is included in FIG. 3. RB402 contains 97.2 mole percent isobutylene and 2.2 mole percent isoprene. The arborescent sample 06DNX001 contains 99.3 mole percent isobutylene and 0.7 mole percent isoprene. However, the molecular architecture is drastically different as RB402 contains linear chains and the isoprene moieties are scattered randomly along the chain. Arborescent polymer 06DNX001 contains a branched PIB core and the isoprene units are attached to the ends of the arms thereby forming a localized high isoprene content isobutylene-isoprene copolymer. While not wishing to be bound to any one theory, the localized nature of 06DNX001 is believed to increase the polymer-filler interactions.

Example 2

06DNX130

Polymerization is carried out in a 3 dm³ round shape baffled glass reactor. The glass reactor is equipped with a glass stirrer road (mounted with a crescent shaped Teflon impeller) and a thermocouple. To the reactor are added 0.70 grams of pMeOCumSt, 900 cm³ hexane (measured at room temperature), 600 cm³ methyl chloride (measured at −92° C.), 2 cm³ di-tert-butylpyridine (measured at room temperature) and 240 cm³ isobutylene (measured at −92° C.). Polymerization is started by the addition of a pre-chilled mixture of 6 cm³ TiCl₄ and 30 cm³ hexane (both measured at room temperature). After 45 minutes of polymerization, a pre-chilled mixture of 70 cm³ isoprene, 0.5 cm³ di-tert-butylpyridine, and 0.90 cm³ dimethyl acetamide (all measured at room temperature) is added. To accelerate the reaction a 1.0 molar solution of ethyl aluminum dichloride in hexane is added in 10 cm³ increments at 45.5, 48 and 50.5 minutes. Addition of the last increment resulted in 4° C. temperature rise indicating the onset of polymerization. Soon after that, the solution started to climb up on the stirrer road indicating an increase in viscosity. Polymerization is terminated at 60 minutes by the addition of 125 cm³ methanol containing 11 grams of NaOH.

After the evaporation of the methyl chloride, hexane is added to the polymer solution and the solution is washed neutral with water. Thereafter, 0.2 grams of Irganox 1076 is added to the solution and the polymer is isolated by steam coagulation and dried on a hot mill to a constant weight. The dried weight of the polymer is 174.23 grams. According to HNMR measurement the amount of 1,4-P enchainment is 2.6 mole percent. The Mooney viscosity of the finished product is determined to be 30.6 (1+8@125° C.).

Figure 4:
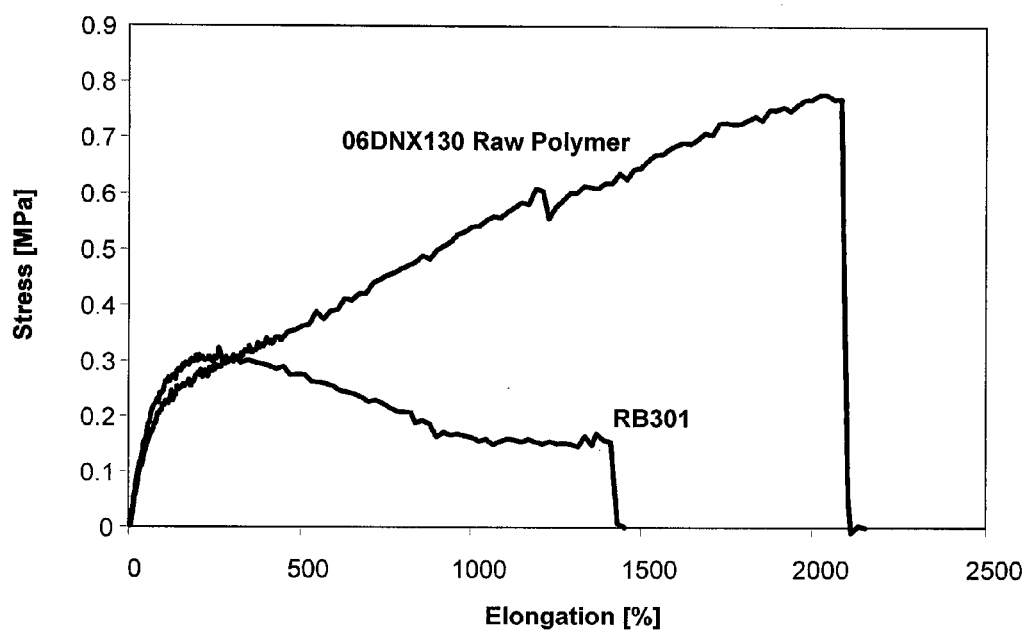
FIG. 4 is a graph depicting plots for stress versus elongation for a raw polymer according to the present invention (06DNX130 RP) and a regular grade butyl (RB301)

The sheeted out raw polymer sample displays unexpected strength (elasticity) at room temperature in spite of its low Mooney viscosity at 125° C. This observation is quantified by green strength measurements. For this measurement micro dumbbells are cut out from molded macro sheets of the raw polymers. The green strength of the arborescent butyl is compared to a high Mooney viscosity (52) regular butyl grade, RB301. FIG. 4 shows plots for stress versus elongation for a raw polymer according to the present invention (06DNX130 RP) and a regular grade butyl (RB301). Increased green strength of the arborescent polymer of the present invention over the linear commercial grade is clearly demonstrated by the continuous rise of tensile strength with elongation. In contrast, the higher Mooney viscosity linear butyl displayed peak strength at about 250% elongation. Following this peak, the linear butyl showed a gradual decrease in strength.

Figure 5:
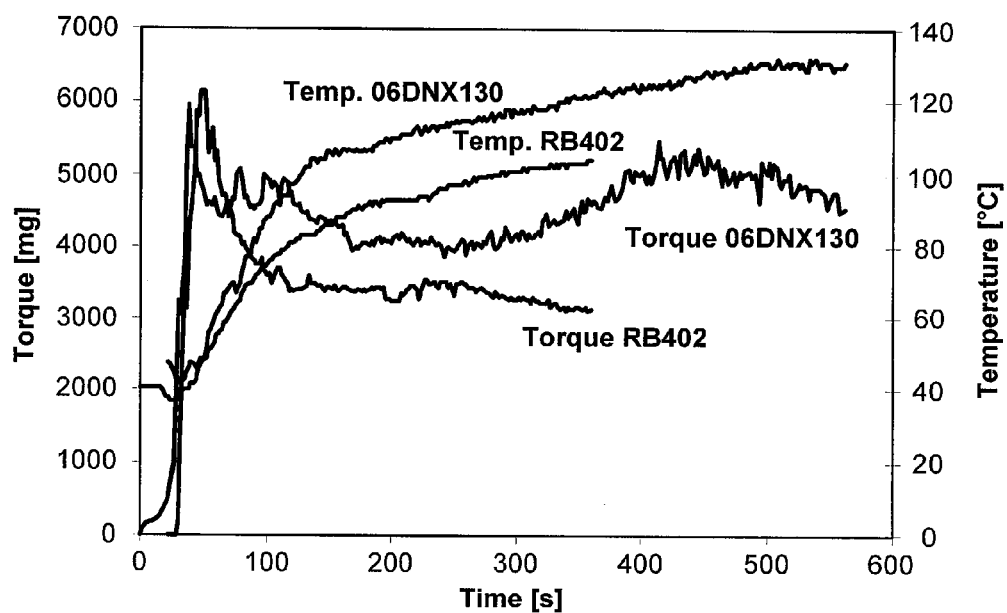
FIG. 5 is a graph depicting torque and temperature increases during mixing for an arborescent polymer in accordance with one embodiment of the present invention (06DNX130) and a commercial grade butyl (RB402)

Raw polymer is mixed with 60 phr N234 carbon black in a Banbury type Brabender mixer using 78.8% fill factor. The torque development and temperature increase during mixing is significantly more pronounced than with typical and/or regular butyl compositions. FIG. 5 is a graph illustrating the torque and temperature increases during mixing for the arborescent polymer of the present invention (06DNX130) and a commercial grade butyl (RB402). The Mooney viscosity of the RB402 sample is determined to be 31.3 (1+8@125° C.).

Maximum temperature, torque and specific energy of the samples prepared in accordance with the present invention are higher than that of the linear samples at the same or even at a lower raw polymer Mooney viscosity. The torque of the arborescent sample formed in accordance with the present invention also shows a second peak as illustrated by FIG. 5. This is an indication of improved filler dispersion. Butyl rubber is known to mix poorly with carbon black. Typically, butyl rubber does not have a distinctive second torque peak or it is very ill defined. Tokita divided a torque curve into three regions (see N. Tokita and I. Pliskin, *Rubber Chew. & Technol.*, 46, 1166 (1973)). The first is the filler wetting region located between the filler addition and the minimum of the power curve, and the second is the dispersion region located between the minimum of the power curve and just over the second power peak. This region is followed by the mastication region. Generally speaking, the higher the second torque peak the better the filler dispersion. According to Tokita, improved filler dispersion is expected to result in a lower Mooney viscosity, higher die swell and mill shrinkage.

Figure 6:
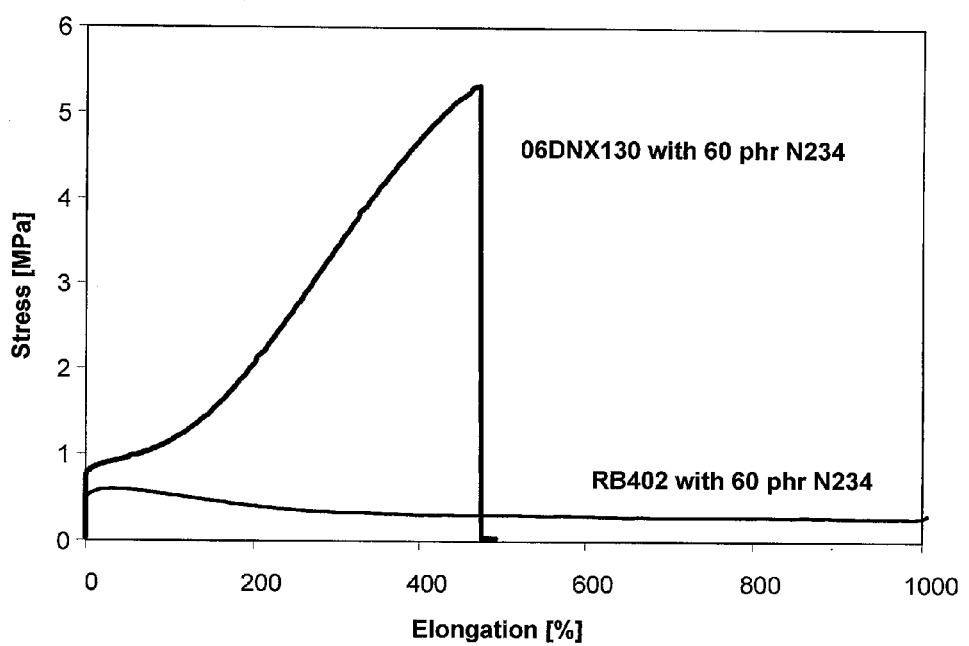
FIG. 6 is a graph depicting plots for stress versus elongation for a polymer according to the present invention with 60 phr N234 carbon black (06DNX130 with 60 phr N234) and a regular grade butyl with 60 phr N234 carbon black (RB402 with 60 phr N234)

The sheeted out black mix shows unexpected strength at room temperature indicating a strong reinforcement uncharacteristic to regular butyl polymers. This is illustrated by the stress strain curves of the carbon black mixes obtained using macro dumbbells cut out from molded macro sheets. FIG. 6 shows plots for stress versus elongation for a polymer according to the present invention with 60 phr N234 carbon black (06DNX130 with 60 phr N234) and a regular grade butyl with 60 phr N234 carbon black (RB402 with 60 phr N234).

Figure 7:
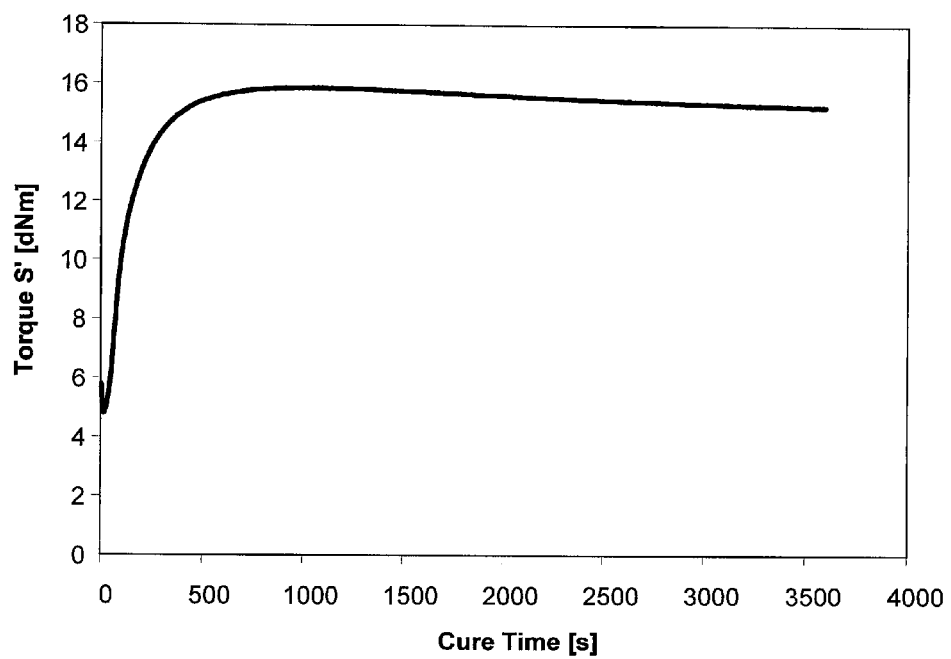
FIG. 7 is a graph depicting storage modulus versus cure time for a sulfur cure of an arborescent polymer (06DNX130) formed in accordance with the present invention, where the polymer contains 60 phr of N234 carbon black.
Figure 8:
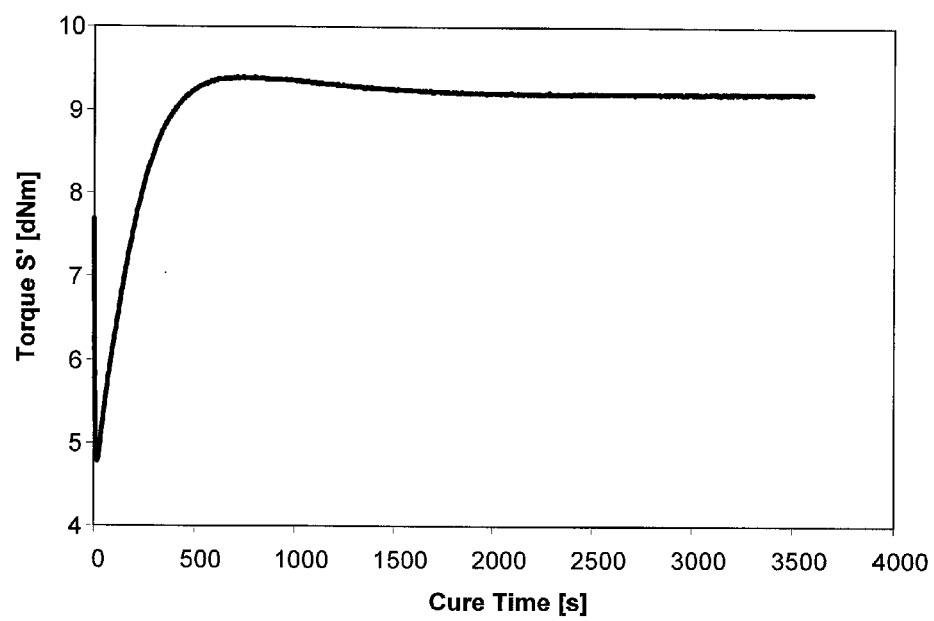
FIG. 8 is a graph depicting storage modulus versus cure time for a peroxide cure of an arborescent polymer (06DNX130) formed in accordance with the present invention, where the polymer contains 60 phr of N234 carbon black.

Cure activity is demonstrated first using the formulation outlined in Table 3 above. The recorded cure curve is shown in FIG. 7. Specifically, FIG. 7 is a graph depicting storage modulus versus cure time for a sulfur cure of an arborescent polymer formed in accordance with the present invention, where the polymer contains 60 phr of N234 carbon black. FIG. 8 illustrates/confirms that an arborescent polymer according to one embodiment of the present invention can be cured using peroxide. The cure is achieved by the addition of 4 phr DiCuP 40° C. and 2 phr HVA#2. Specifically, FIG. 8 is a graph depicting storage modulus versus cure time for a peroxide cure of an arborescent polymer formed in accordance with the present invention, where the polymer contains 60 phr of N234 carbon black.

Figure 9:
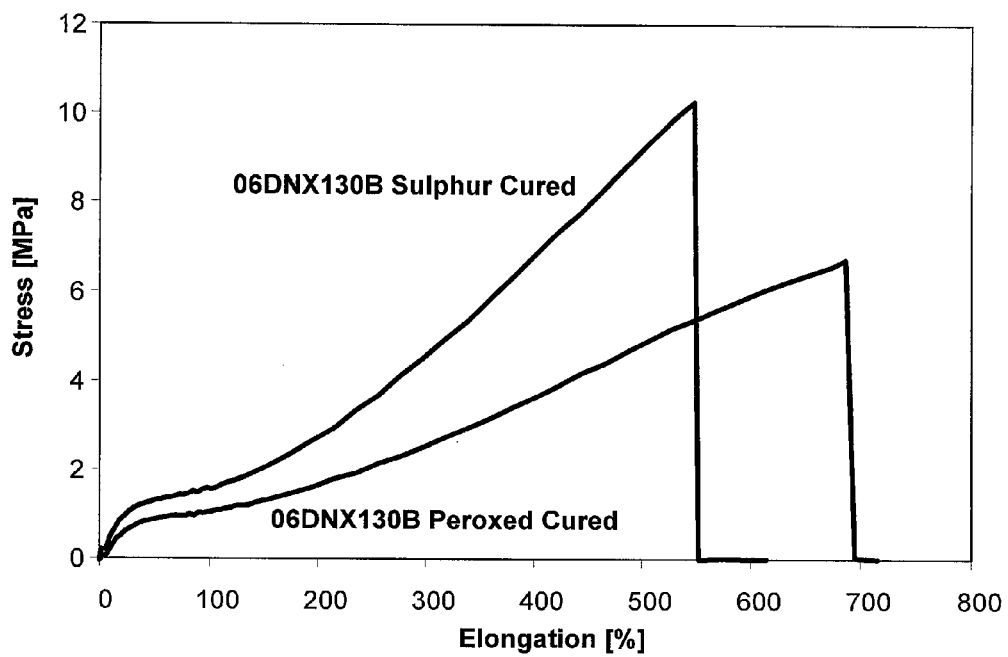
FIG. 9 is a graph depicting plots for stress versus elongation for the cured polymers of FIGS. 7 and 8.

FIG. 9 is a graph depicting plots for stress versus elongation for the cured polymers of FIGS. 7 and 8.

Figure 10:
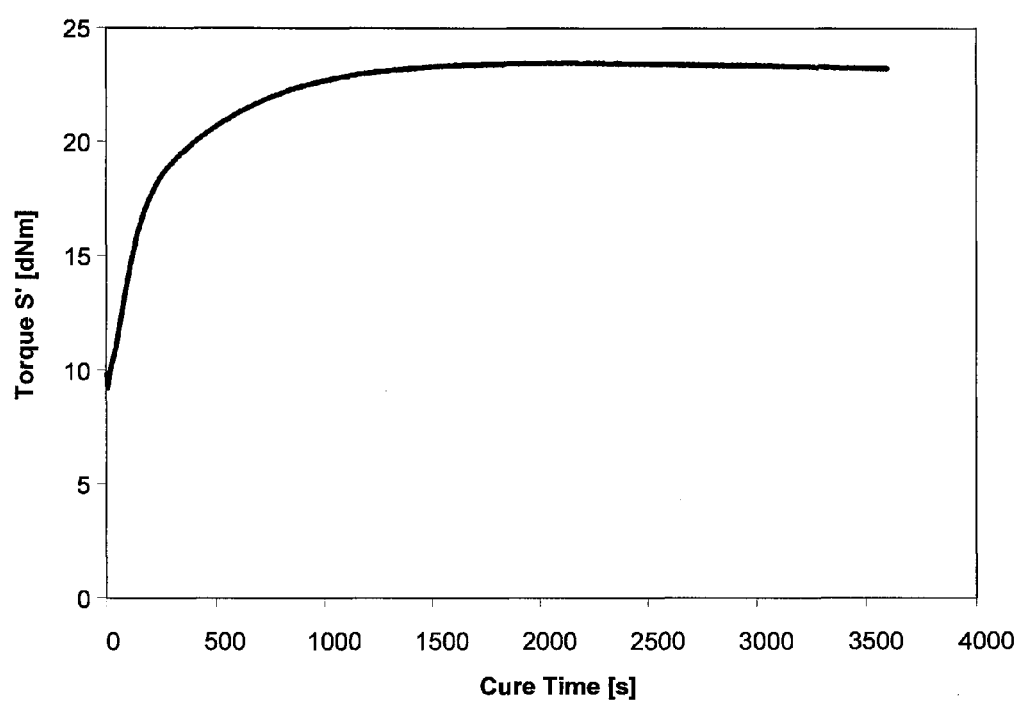
FIG. 10 is a graph depicting a plot of storage modulus versus cure time obtained for an arborescent polymer composition in accordance with one embodiment of the present invention, where the polymer (06DNX130) contains 100 parts of N234 carbon black and the plot is obtained at a temperature of 166° C.

A sample of this example (06DNX130) is also mixed with 100 phr N234 carbon black in order to demonstrate the ability of an arborescent polymer formed in accordance with the present invention to absorb a high quantity of filler. After the mix a smooth compound is obtained and no loose carbon black is detected in the mixer. The mix is compounded with the curatives listed in Table 3, using the indicated loading. FIG. 10 is a graph depicting a plot of storage modulus versus cure time obtained for this composition at 166° C.

Example 3

05DNX150

This is a comparative example designed to determine the behavior of the arborescent PIB core.

Polymerization is carried out in a 5 dm³ round shape baffled glass reactor. The glass reactor is equipped with a glass stirrer road (mounted with a crescent shaped Teflon impeller) and a thermocouple. To the reactor are added 0.7 grams of pMeOCumSt, 1800 cm³ methyl-cyclohexane (measured at room temperature), 1200 cm³ methyl chloride (measured at −95° C.), 4 cm³ di-tert-butylpyridine (measured at room temperature) and 480 cm³ isobutylene (measured at −95° C.). Polymerization is started at −93° C. by the addition of a pre-chilled mixture of 11 cm³ TiCl₄ and 40 cm³ methyl-cyclohexane (both measured at room temperature). After 85 minutes of polymerization, a mixture of 100 cm³ isoprene (measured at room temperature), 250 cm³ of isobutylene (measured at −95° C.), and 250 cm³ methyl-cyclohexane (measured at room temperature) is added. Polymerization is terminated at 122 minutes by the addition of 125 cm³ methanol containing 11 grams of NaOH. During the polymerization samples are taken using a cold pipette. Samples are discharged into test tubes containing 10 cm³ of methanol.

After the evaporation of methyl chloride, hexane is added to the polymer solution and the solution is washed neutral with water. The resulting polymer is isolated with steam coagulation and dried on a hot mill to a constant weight.

HNMR analysis indicates that the amount of isoprene incorporated into the polymer is very low, approximately 0.1 mole percent.

During polymerization, samples are withdrawn from the charge using a cold pipette at different times and injected into vials containing methanol. The molecular weights of these samples are measured to illustrate the increase in molecular weight during polymerization. The characteristics of various samples taken at different time intervals are noted in Table 4.

TABLE 4

| Sample | Reaction Time | dn/dc | $M_n$ (g/mol) | $M_w$ (g/mol) | $M_z$ (g/mol) | $M_w/M_n$ |
|---|---|---|---|---|---|---|
| 05DNX150-1 | 25 | 0.114 | 86,800 | 119,500 | 182,300 | 1.38 |
| 05DNX150-2 | 52 | 0.114 | 190,300 | 355,100 | 969,100 | 1.87 |
| 05DNX150-3 | 75 | 0.117 | 254,500 | 529,600 | 1,229,000 | 2.08 |
| 05DNX150-4 | 90 | 0.111 | 289,600 | 624,700 | 1,478,000 | 2.16 |
| 05DNX150-5 | 100 | 0.111 | 295,300 | 617,100 | 1,414,000 | 2.09 |
| 05DNX150-6 | 110 | 0.111 | 293,100 | 622,000 | 1,384,000 | 2.12 |

In Table 4, the time column indicates the time at which samples for testing are withdrawn from the above described polymerization reaction.

Example 4

06DNX090

This is another comparative example designed to determine the behavior of the arborescent PIB core.

Polymerization is carried out in a 3 dm³ round shape baffled glass reactor. The glass reactor is equipped with a glass stirrer road (mounted with a crescent shaped Teflon impeller) and a thermocouple. To the reactor are added 0.7 grams of pMeOCumSt, 900 cm³ hexane (measured at room temperature), 600 cm³ methyl chloride (measured at −95° C.), 2 cm³ di-tert-butylpyridine (measured at room temperature) and 240 cm³ isobutylene (measured at −95° C.). Polymerization is started at −93° C. by the addition of a pre-chilled mixture of 6 cm³ TiCl₄ and 30 cm³ methyl cyclohexane (both measured at room temperature). Polymerization is terminated at 121 minutes by the addition of 125 cm³ methanol containing 11 grams of NaOH. During the polymerization samples are taken using a cold pipette. Samples are discharged into test tubes containing 10 cm³ of methanol.

After the evaporation of methyl chloride, hexane is added to the resulting polymer solution and the solution is washed neutral with water. The resulting polymer is isolated with steam coagulation and dried on a hot mill to a constant weight. The dried weight of the polymer is 164.54 grams.

FIG. 4, as discussed above, also illustrates that a polymer according to the present invention in combination with 60 phr N234 carbon black (06DNX130 with 60 phr N234) behaves like a cured elastomer. The black mix can be repeatedly remolded and upon cooling down a new rubber-like article is obtained.

Figure 11:
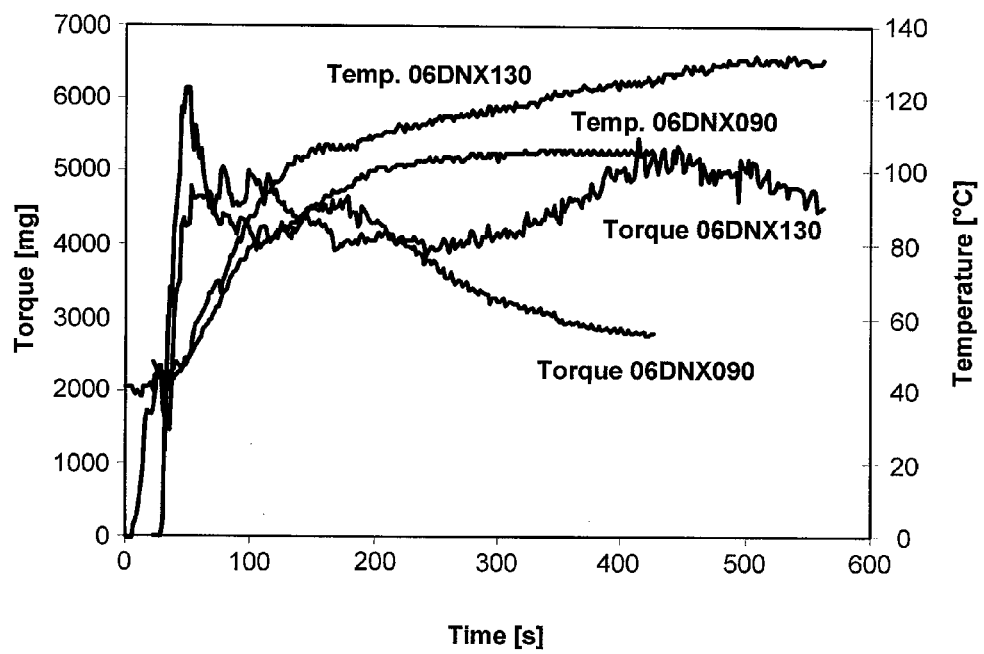
FIG. 11 is a graph depicting torque and temperature increases during mixing for an arborescent polymer in accordance with one comparative example of the present invention (06DNX090) and an arborescent polymer in accordance with one embodiment of the present invention (06DNX130)

The following comparison proves that the arborescent nature of the PIB core does not result in the improved torque development during the mix or the observed TPE behavior of the black mix. FIG. 11 compares a mixing curve for an arborescent compound of Example 2 (06DNX130) with the mixing behavior of the arborescent PIB core of this Example (06DNX090). Specifically, FIG. 11 is a graph depicting torque and temperature increases during mixing for an arborescent polymer in accordance with Example 4 of the present invention (06DNX090) and an arborescent polymer in accordance with Example 2 of the present invention (06DNX130).

As can be seen in FIG. 11 the second large torque peak is absent from the mixing curve of the arborescent PIB core composition this Example (06DNX090). Also the temperature plateaus out at an earlier time and stabilizes at a lower value during mixing for the arborescent PIB core composition of this Example (06DNX090) as compared to the arborescent compound of Example 2 (06DNX130).

Example 5a

06DNX030

Polymerization is carried out in a 3 dm³ round shape baffled glass reactor. The glass reactor is equipped with a glass stirrer rod (mounted with a crescent shaped Teflon impeller) and a thermocouple. To the reactor are added 0.35 grams of pMeOCumSt, 900 cm³ hexane (measured at room temperature), 600 cm³ methyl chloride (measured at −95° C.), 2 cm³ di-tert-butylpyridine (measured at room temperature) and 240 cm³ isobutylene (measured at −95° C.). Polymerization is started at −93° C. by the addition of a pre-chilled mixture of 6 cm³ TiCl₄ and 20 cm³ hexane (both measured at room temperature). After 85 minutes of polymerization time a pre-chilled mixture of 250 cm³ hexane, 70 cm³ pMeSt, 0.5 cm³ of di-tert-butylpyridine (all measured at room temperature), 150 cm³ methyl chloride along with 120 cm³ isobutylene (measured at −95° C.) is added. After 200 minutes of total polymerization time, the reaction is terminated by the addition of 11 grams of NaOH dissolved in 125 cm³ methanol. During the polymerization samples are taken using a cold pipette. Samples are discharged into test tubes containing 10 cm³ of methanol.

From independent rate measurements the unreacted isobutylene in the reactor is calculated to be 4.9 grams at the moment of the addition of pMeSt/IB mixture. Therefore the pMeSt content of the monomer charge after addition of the monomer mixture is 24.8 mole percent. After the evaporation of methyl chloride, hexane is added to the polymer solution and the solution is washed neutral with water. The resulting polymer is isolated with steam coagulation and dried on a hot mill followed by molding in a press at 180° C. The dried weight of the polymer is 188.96 grams.

HNMR measurement indicated that the overall pMeSt content of the resulting polymer is 4.5 mole percent or 9.5 weight percent.

During polymerization, samples are withdrawn from the charge using a cold pipette at different times and injected into vials containing methanol. The molecular weights of these samples are measured to illustrate the increase in molecular weight during polymerization. The characteristics of various samples taken at different time intervals are noted in Table 5.

TABLE 5

| Sample | Reaction Time | $M_w$ (g/mol) | $M_n$ (g/mol) | $M_w/M_n$ |
|---|---|---|---|---|
| 06DNX030-1 | 15 | 123,000 | 86,680 | 1.42 |
| 06DNX030-2 | 30 | 222,700 | 136,800 | 1.63 |
| 06DNX030-3 | 50 | 364,000 | 189,700 | 1.92 |
| 06DNX030-4 | 80 | 482,700 | 218,100 | 2.21 |
| 06DNX030-5 | 95 | 473,300 | 252,000 | 1.88 |
| 06DNX030-6 | 115 | 540,900 | 273,200 | 1.98 |
| 06DNX030-7 | 145 | 506,100 | 262,200 | 1.93 |

In Table 4, the time column indicates the time at which samples for testing are withdrawn from the above described polymerization reaction.

Figure 12:
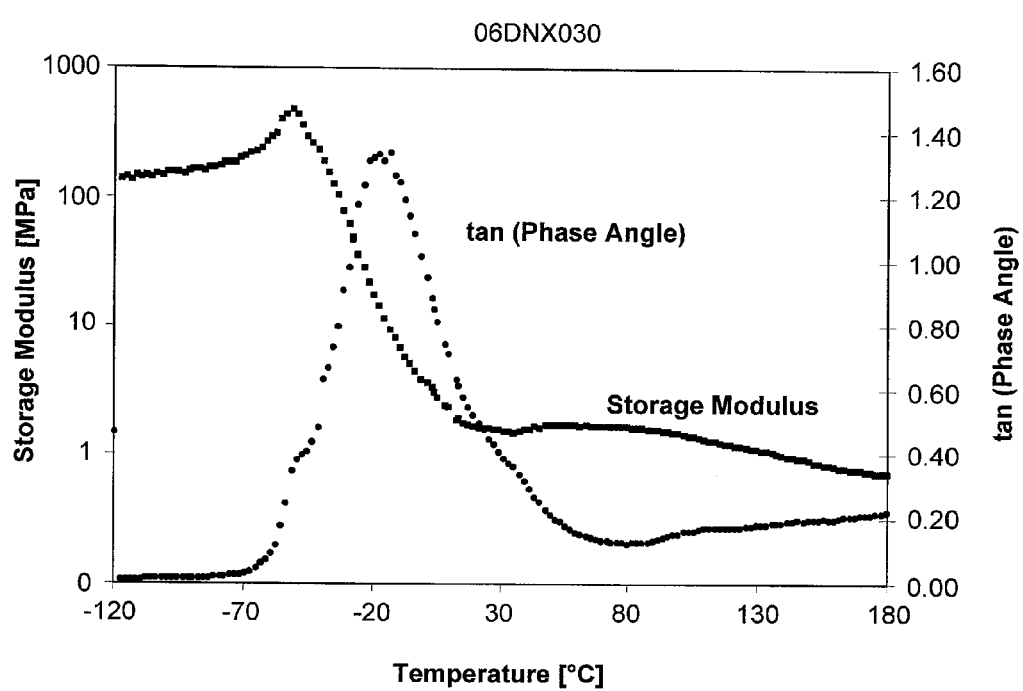
FIG. 12 is a graph depicting plots of storage modulus versus temperature phase angle versus temperature for an arborescent polymer (06DNX030) formed in accordance with one embodiment of the present invention.

The glass transition temperature of the outer IB-co-pMeSt sequences can not be detected by DSC. Dynamic testing of the raw polymer also fails to show the glass transition temperature of the outer segments (FIG. 12).

Figure 14:
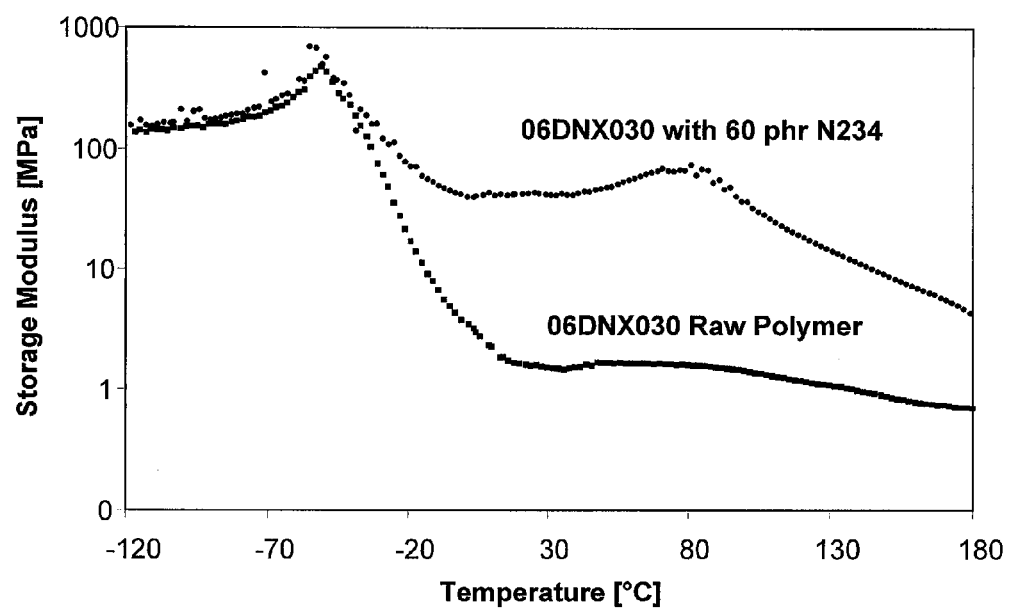
FIG. 14 is a graph depicting plots of storage modulus versus temperature for a raw polymer (06DNX030) formed in accordance with one embodiment of the present invention and for a polymer (06DNX030) formed in accordance with one embodiment of the present invention mixed with 60 phr N234 carbon black.

Raw polymer (06DNX030) is mixed with 60 phr N234 carbon black in a Banbury type Brabender mixer using 78.8% fill factor. Dynamic testing of the black mix reveals the presence of a rubbery plateau (FIG. 14). Specifically, FIG. 14 is a graph depicting plots of storage modulus versus temperature for a raw polymer (06DNX030) formed in accordance with one embodiment of the present invention and for a polymer (06DNX030) formed in accordance with one embodiment of the present invention mixed with 60 phr N234 carbon black.

Figure 15:
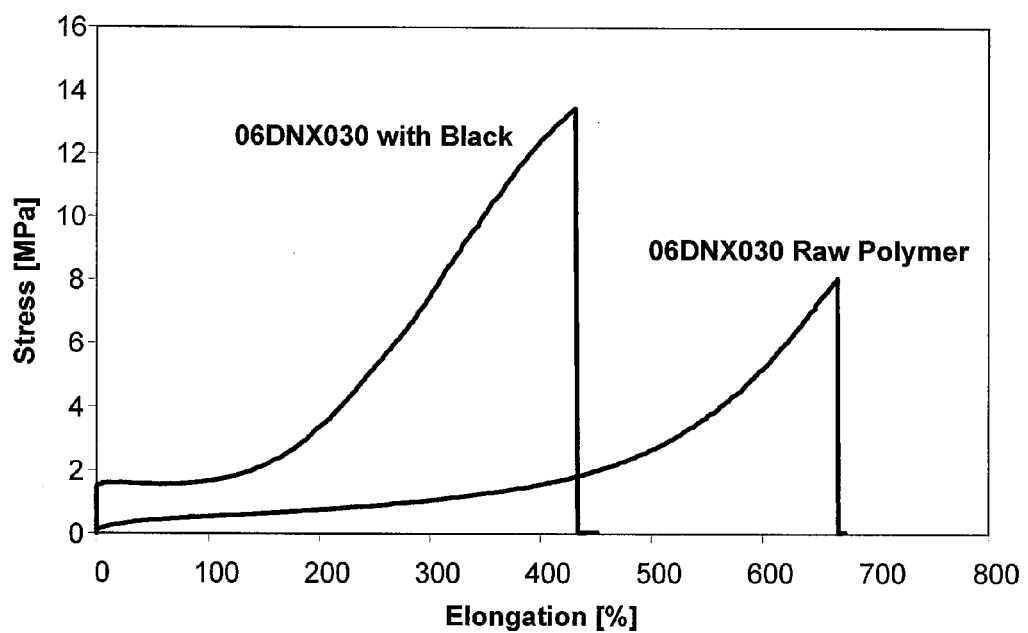
FIG. 15 is a graph depicting plots for stress versus elongation for a polymer according to the present invention with 60 phr N234 carbon black (06DNX030 with carbon black) and a raw polymer (06DNX030) formed in accordance with one embodiment of the present invention.

The sheeted out black mix shows unexpected strength at room temperature indicating a strong reinforcement uncharacteristic to regular butyl polymers. This is illustrated by the stress strain curves of the black mix obtained using macro dumbbells cut out from molded macro sheets. Molding is done at 160° C. FIG. 15 is a graph depicting plots for stress versus elongation for a polymer according to the present invention with 60 phr N234 carbon black (06DNX030 with carbon black), and a raw polymer (06DNX030) formed in accordance with one embodiment of the present invention. FIG. 15 illustrates that a molded article has a significant strength and it behaves like a cured elastomer at room temperature.

Example 5b

06DNX030

Figure 13:
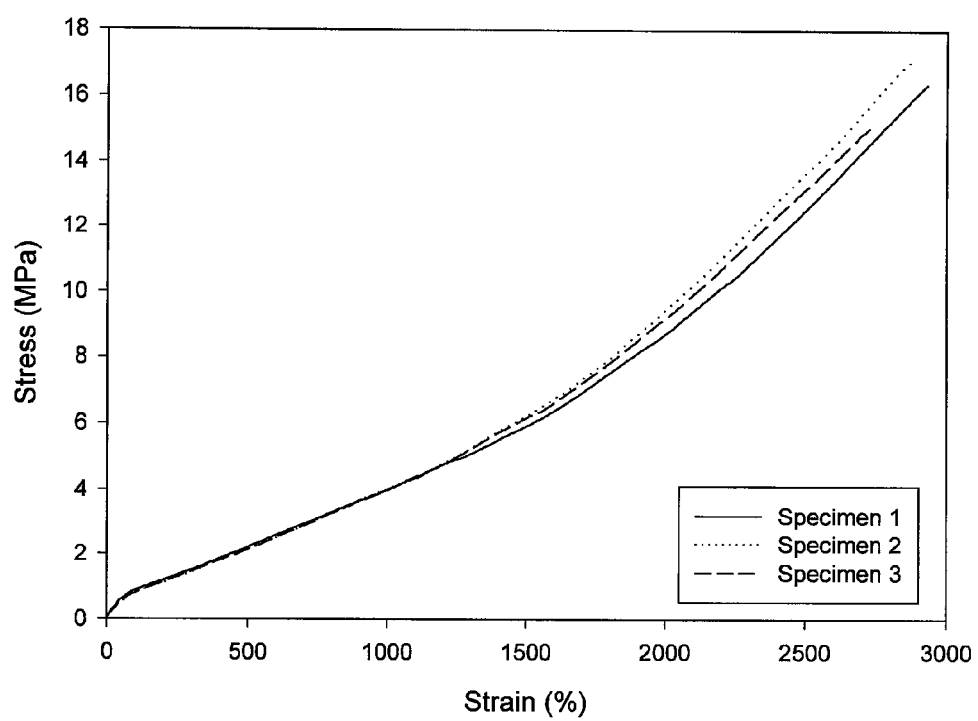
FIG. 13 is a graph depicting plots for stress versus strain for the samples (06DNX030) prepared in accordance with one embodiment of the present invention.

Five mixes are formed by mixing 100 parts of Example 5a (06DNX030) with 20 parts silica (Zeosil 1165 MP available from Rhodia) in a Haake Buchler Rheocord System 40 drive unit equipped with a 75 cc Rheomix mixer, without any compatibilizer additives. For all the mixes a 73% fill factor is used. The mixer is heated to 130° C. and is loaded at 20 rpm with the rubber followed by the silica. Mixing is carried out at 100 rpm using a maximum of 5 minutes mixing time and the compound was dumped at 170° C. Sheets are compression molded at 180° C. using a 63.6 mm by 63.6 mm by 1.26 mm square mold having a 10 mm wide slit on one side for the overflow of excess material, and the following procedure: samples are heated for 3 minutes in the mold and molded at the specified temperature for 5 minutes using 30 tons ram force (5" diameter ram). After five minutes the mold is transferred to a cold press to cool the sample. Microdumbbell specimens are cut from the sheet. FIG. 13 shows the stress-strain curves of this material. As can be seen from FIG. 13, strong filler reinforcement occurs (from 8 to 16 MPa) in the samples made in accordance with this Example.

Example 6

06DNX110

Polymerization is carried out in a 3 dm$^3$ round shape baffled glass reactor. The glass reactor is equipped with a glass stirrer rod (mounted with a crescent shaped Teflon impeller) and a thermocouple. To the reactor is added 0.7 grams of Epoxy Inimer, 900 cm$^3$ hexane (measured at room temperature), 600 cm$^3$ methyl chloride (measured at −95° C.), 2 cm$^3$ di-tert-butylpyridine (measured at room temperature) and 240 cm$^3$ isobutylene (measured at −95° C.). Polymerization is started at −93° C. by the addition of a pre-chilled mixture of 6 cm$^3$ TiCl$_4$ and 30 cm$^3$ hexane (both measured at room temperature). After 67 minutes of polymerization time a pre-chilled mixture of 250 cm$^3$ hexane, 70 cm$^3$ pMeSt, 1.0 cm$^3$ of di-tert.-butylpyridine, 0.9 cm$^3$ of dimethyl acetamide (all measured at room temperature), 150 cm$^3$ methyl chloride along with 120 cm$^3$ isobutylene (measured at −95° C.) is added. After 160 minutes of total polymerization time, the reaction is terminated by the addition of 11 grams of NaOH dissolved in 125 cm$^3$ of methanol. During the polymerization, samples are taken using a cold pipette. Samples are discharged into test tubes containing 10 cm$^3$ of methanol.

From rate measurements, the unreacted isobutylene in the reactor is calculated to be 19.2 grams at the moment of the addition of pMeSt/IB mixture. Therefore the pMeSt content of the monomer charge after addition of the monomer mixture is 22.2 mole percent.

Figure 16:
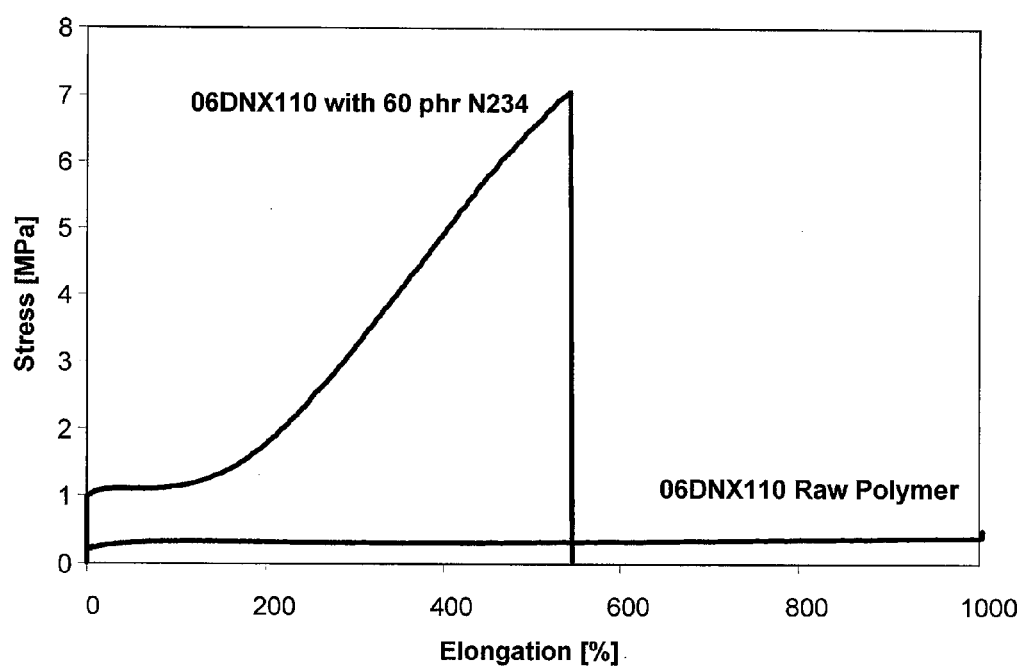
FIG. 16 is a graph depicting plots for stress versus elongation for a polymer according to the present invention with 60 phr N234 carbon black (06DNX110 mixed with 60 phr N234)

After the evaporation of methyl chloride, hexane is added to the polymer solution and the solution is washed neutral with water. The resulting polymer is isolated with steam coagulation and dried on a hot mill followed by molding the polymer in a press at 180° C. The dried weight of the polymer is 155.30 grams. HNMR measurement indicates that the overall pMeSt content of the resulting polymer is 2.3 mole percent or 4.8 weight percent. The raw polymer is then mixed with 60 phr N234 carbon black. The black mix displays a rubber-like behavior. A macro sheet is compression molded at 160° C. and the stress strain behavior is compared to the raw polymer. FIG. 16 shows the recorded stress strain curves. Specifically, FIG. 16 is a graph depicting plots for stress versus elongation for a polymer according to the present invention with 60 phr N234 carbon black (06DNX110 mixed with 60 phr N234) and a raw polymer (06DNX110), formed in accordance with one embodiment of the present invention.

Example 7

06DNX120

Polymerization is carried out in a 3 dm$^3$ round shape baffled glass reactor. The glass reactor is equipped with a glass stirrer rod (mounted with a crescent shaped Teflon impeller) and a thermocouple. To the reactor is added 0.7 grams of Epoxy Inimer, 900 cm$^3$ hexane (measured at room temperature), 600 cm$^3$ methyl chloride (measured at −95° C.), 2 cm$^3$ di-tert-butylpyridine (measured at room temperature) and 240 cm$^3$ isobutylene (measured at −95° C.). Polymerization is started at −93° C. by the addition of a pre-chilled mixture of 6 cm$^3$ TiCl$_4$ and 30 cm$^3$ hexane (both measured at room temperature). After 37.5 minutes of polymerization time a pre-chilled mixture of 250 cm$^3$ hexane, 70 cm$^3$ pMeSt, 1.0 cm$^3$ of di-tert.-butylpyridine, 0.9 cm$^3$ of dimethyl acetamide (all measured at room temperature) and 150 cm$^3$ methyl chloride along with 120 cm$^3$ isobutylene (measured at −95° C.) is added. After 151 minutes of total polymerization time, the reaction is terminated by the addition of 11 grams of NaOH dissolved in 125 cm$^3$ of methanol. During the polymerization, samples are taken using a cold pipette. Samples are discharged into test tubes containing 10 cm$^3$ of methanol.

From rate measurements, the unreacted isobutylene in the reactor is calculated to be 51.3 grams at the moment of the addition of pMeSt. Therefore, the pMeSt content of the monomer charge after addition of the monomer mixture is 36.8 mole percent.

After the evaporation of methyl chloride, hexane is added to the polymer solution and the solution is washed neutral with water. The resulting polymer is isolated with steam coagulation and dried on a hot mill followed by molding the polymer in a press at 180° C. The dried weight of the polymer is 156 grams. HNMR measurement indicates that the overall pMeSt content of the resulting polymer is 7.9 mole percent or 16.8 weight percent. The raw polymer is then mixed with 60 phr N234 carbon black. The black mix displays a rubber-like behavior. A macro sheet is compression molded at 160° C. and the stress strain behavior is compared to the raw polymer.

FIG. 17 depicts the recorded stress strain curves for the above samples. Specifically, FIG. 17 is a graph depicting plots for stress versus elongation for a polymer according to the present invention with 60 phr N234 carbon black (06DNX120 mixed with 60 phr N234) and a raw polymer (06DNX120) formed in accordance with one embodiment of the present invention. In this case the raw polymer already displays thermoplastic elastomeric properties. However, 60 phr carbon black reinforces the material substantially, nearly doubling its tensile strength.

In the 0° C. to 200° C. range, $T_g$=111.6° C. This is characteristic of the poly(paramethylstyrene) end blocks (PMS) measured on the raw polymer (TA Instruments DSC, 10° C./min heating rate, 10 mg sample). The $T_g$ of the polymer filled with carbon black was 140.7° C. The raw polymer is extracted with methyl ethyl ketone, hexane and ethanol (Soxhlet extractor, 10 to 15 passes at reflux temperature). There is no measurable weight loss after the exhaustive extraction.

Samples of the raw and black-filled polymer are subjected to biodegradation studies in vitro. Twelve discs (D=12 mm) are cut from 1 mm thick sheets. A pH 7.4 Buffer solution is prepared with DI water from Hydrion Chemvelopes –7.4+/– 0.02 @25° C. buffer. A color indicator is added to show freshness of buffer. Samples are placed into wells with 2 mL of buffer in each well. The tray is placed in an incubator on a shaker (CAT 520) at motor level 2 (Selutec TECO 20), with the temperature set at 36° C. The experiment is carried out for 20 days, the buffer is changed every Monday, Wednesday, and Friday and the mass is recorded. FIG. 18 shows the results based on a plot of swelling percentage versus days of exposure for the samples noted above. No biodegradation is observed, and the carbon-filled sample was more hydrophilic.

In vitro testing of response to bacteria is carried out as follows: EF260506 and EF310506 samples (5 mm discs sterilized by ethylene oxide) are placed on Agar containing human erythrocytes (HE). The plates are inoculated with bacteria: first bacteria—*staphylococcus aureas* (S.A.) at a 0.5 McF concentration and at a 0.005 McF concentration, the second bacteria—MRSA at a 0.5 McF concentration and at a 0.005 McF concentration. A third sample of each polymer is placed on Agar with no HE and S.A. is added at 0.005 McF. The samples are placed in an incubator set at 35° C. for 24 hours, then inhibition zones are measured and photographs are taken. No inhibition zones are found around the polymer disks.

In vivo biocompatibility studies are carried out by implanting microdumbbells into rats. The samples are explanted after 6 months. Excellent tissue interaction (no inflammation) is observed.

Example 8

Polymerization is carried out in a 500 cm³ round shape baffled glass reactor. The reactor is equipped with a glass stirrer rod (mounted with a crescent shaped Teflon impeller) and a thermocouple. To the reactor are added 0.07 grams of pMeOCumSt inimer, 90 cm³ methylcyclohexane (measured at room temperature), 60 cm³ methyl chloride (measured at –92° C.), 0.2 cm³ di-tert-butylpyridine (measured at room temperature) and 24 cm³ isobutylene (measured at –92° C.). Polymerization is started at –92° C. by addition of a prechilled mixture of 0.6 cm³ $TiCl_4$ and 3 cm³ methylcyclohexane (both measured at room temperature). After 45 minutes of polymerization, a mixture of 2 cm³ of cyclopentadiene (measured at room temperature), 5 cm³ of isobutylene, 10 cm³ methylcyclohexane (measured at room temperature), and 0.2 cm³ di-tert-butylpyridine (measured at room temperature). Upon the addition of the cyclopentadiene charge, the solution turns light orange and increases in viscosity. Polymerization is terminated at 54 minutes by the addition of 15 cm³ ethanol containing 1 gram of NaOH.

After the evaporation of methyl chloride, hexane is added to the polymer solution and the solution is washed neutral with water. The polymer product is isolated with steam coagulation and dried in an oven at 100° C. under vacuum for 48 hours to remove residual water. The isolated polymeric material was white in appearance with a dry weight of 17.2 grams. The material was completely soluble (gel-free) and is analyzed by HNMR and SEC. The HNMR indicated that the cyclopentadiene content of the material is 0.4 mole percent. Table 6 below lists data relating to this Example.

FIG. 19 depicts the recorded stress strain curves for the unfilled materials. Specifically, FIG. 19 is a graph depicting plots for stress versus elongation for raw polymer samples for PB402 and for a polymer with 0.4 mole percent CPD. RB402 contains 97.2 mole percent polyisobutylene PIB and 2.2 mole percent isoprene IP. The arborescent sample contains 99.6 mole percent isobutylene and 0.4 mole percent cyclopentadiene. However, as with the previous example, the molecular architecture is drastically different as RB402 contains linear PIB chains and the unsaturated groups (IP) are scattered randomly along the chain. The arborescent polymer of the present example contains a branched PIB core and the cyclopentadiene units are in the IB-co-CPD block attached to the ends of the arms thereby forming a localized high cyclopentadiene content in the copolymer. In FIG. 19, the materials show a yield point and behave as predicted, without any filler.

The raw polymer from Example 8 is then mixed with 60 phr N234 carbon black on a Brabender micro-mill with a roll temperature of 45° C. The sheeted out black mix shows unexpected strength at room temperature as shown in FIG. 20, indicating a strong reinforcement uncharacteristic to regular butyl polymers. To help illustrate this effect, a comparative example using PB 402 (a commercial grade of butyl) is prepared. A macro sheet is compression molded at 130° C. and the stress strain behavior is compared. The arbPIB-CPD functionalized polymer of the invention with only 0.4 mol % of cyclopentadiene (Example 8) provides additional evidence of significant filler interaction, which is not apparent in the linear PB402 sample.

FIG. 20 as discussed above, also illustrates that a polymer according to the present invention in combination with 60 phr N234 carbon black (Example 10 with 60 phr N234) behaves like a cured elastomer. However, the black mix can be repeatedly remolded and upon cooling down a new rubber-like article is obtained (recyclable rubber).

TABLE 6

| Sample | Yield (g) | $M_n$ (kg/mol) | $M_w$ (kg/mol) | $M_z$ (kg/mol) | $M_w/M_n$ | Mole Percent CPD (HNMR) |
|---|---|---|---|---|---|---|
| Example 8 | 17.2 | 216 | 486 | 1954 | 2.25 | 0.4 |

The glass transition temperature of the outer IB-co-CPD sequences can not be detected by DSC for either the raw polymer or the filled compound (FIGS. 21A and 21B).

Example 9

Polymerization is carried out in a 500 cm³ round shape baffled glass reactor. The reactor is equipped with a glass stirrer rod (mounted with a crescent shaped Teflon impeller) and a thermocouple. To the reactor are added 0.07 grams of pMeOCumSt, 90 cm³ methylcyclohexane (measured at room temperature), 60 cm³ methyl chloride (measured at −92° C.), 0.2 cm³ di-tert-butylpyridine (measured at room temperature) and 24 cm³ isobutylene (measured at −92° C.). Polymerization is started at −92° C. by addition of a pre-chilled mixture of 0.6 cm³ TiCl₄ and 3 cm³ methylcyclohexane (both measured at room temperature). After 45 minutes of polymerization, a mixture of 5 cm³ of cyclopentadiene (measured at room temperature), 2 cm³ of isobutylene, 10 cm³ methylcyclohexane (measured at room temperature), and 0.2 cm³ di-tert-butylpyridine (measured at room temperature). Upon the addition of the cyclopentadiene charge, the solution turns light orange and dramatically increases in viscosity. Polymerization is terminated at 48 minutes by the addition of 15 cm³ ethanol containing 1 gram of NaOH.

After the evaporation of methyl chloride, hexane is added to the polymer solution and the solution is washed neutral with water. The polymer product is isolated with steam coagulation and dried in an oven at 100° C. under vacuum for 48 hours to remove residual moisture. The isolated polymeric material is white in appearance with a dry weight of 16.5 grams. The material contains low amounts of gel (approximately 1%) and therefore only the soluble fraction is analyzed by HNMR and SEC. The HNMR indicated that the cycopentadiene content of the soluble fraction is 1.7 mole percent. The resulting data is shown below in Table 7.

FIG. 19 depicts the recorded stress strain curves for the unfilled materials. Specifically, FIG. 19 is a graph depicting plots for stress versus elongation for raw polymer samples. In this example, the arborescent material contains 98.3 mole percent isobutylene and 1.7 mole percent cyclopentadiene. However, as with the previous example, the molecular architecture is drastically different as RB402 contains linear PIB chains and the unsaturated groups (IP) are scattered randomly along the chain. The arborescent polymer of the present example contains a branched PIB core and the cyclopentadiene units are in the IB-co-CPD block attached to the ends of the arms thereby forming a localized high cyclopentadiene content in the copolymer. In FIG. 19, the materials show a yield point and behave as predicted, without any filler.

The raw polymer from this example (Example 9) is then mixed with 60 phr N234 carbon black on a Brabender micromill with a roll temperature of 45° C. The sheeted out black mix shows unexpected strength at room temperature as shown in FIG. 20, indicating a strong reinforcement uncharacteristic to regular butyl polymers. As before, this effect is illustrated by comparison with PB 402 (a commercial grade of butyl). The arbPIB-CPD functionalized polymer of the present invention, with 1.7 mole percent of cyclopentadiene groups (Example 9), shows evidence of significant filler interaction, which is not apparent in the linear PB402 sample.

FIG. 20 as discussed above, also illustrates that a polymer according to the present invention in combination with 60 phr N234 carbon black (Example 9 with 60 phr N234) behaves like a cured elastomer. However, the black mix can be repeatedly remolded and upon cooling down a new rubber-like article is obtained (i.e., recyclable rubber).

TABLE 7

| Sample | Yield (g) | $M_n$ (kg/mol) | $M_w$ (kg/mol) | $M_z$ (kg/mol) | $M_w/M_n$ | Mole Percent CPD (HNMR) |
|---|---|---|---|---|---|---|
| Example 9 (soluble fraction) | 16.5 | 207 | 455 | 2759 | 2.20 | 1.7 |

Example 10

Polymerization is carried out in a 500 cm³ round shape baffled glass reactor. The reactor is equipped with a glass stirrer rod (mounted with a crescent shaped Teflon impeller) and a thermocouple. To the reactor are added 0.07 grams of pMeOCumSt inimer, 90 cm³ hexane (measured at room temperature), 60 cm³ methyl chloride (measured at −92° C.), 0.2 cm³ di-tert-butylpyridine (measured at room temperature) and 24 cm³ isobutylene (measured at −92° C.). Polymerization is started at −92° C. by addition of a pre-chilled mixture of 0.6 cm³ TiCl₄ and 3 cm³ hexane (both measured at room temperature). After 45 minutes of polymerization, a mixture of 7 cm³ of cyclopentadiene (measured at room temperature), 10 cm³ hexanes (measured at room temperature), 0.1 cm³ di-tert-butylpyridine (measured at room temperature), and 0.1 cm³ dimethylacetamide is added. Upon the addition of the cyclopentadiene charge, the solution turns light orange and dramatically increases in viscosity. Polymerization is terminated at 48 minutes by the addition of 15 cm³ ethanol containing 1 gram of NaOH.

After the evaporation of methyl chloride, hexane is added to the polymer solution and the solution is washed neutral with water. The polymer product is isolated with steam coagulation and dried in an oven at 100° C. under vacuum for 48 hours to remove residual water. The isolated polymeric material for example 10 is white in appearance with a dry weight of 18.4 grams. The resulting material contains a fraction of gel (approximately 48%) and therefore only the soluble portion is fully characterized using HNMR and SEC techniques. The resulting data is presented below in Table 8. HNMR measurement indicates that the overall cyclopentadiene content of the soluble fraction of the polymer is 3.5 mole percent.

TABLE 8

| Sample | Yield (g) | $M_n$ (kg/mol) | $M_w$ (kg/mol) | $M_z$ (kg/mol) | $M_w/M_n$ | Mole Percent CPD (HNMR) |
|---|---|---|---|---|---|---|
| Example 10 (soluble fraction) | 18.4 | 80 | 408 | 1288 | 5.1 | 3.5 |

Example 11

Polymerization is carried out in a 500 cm³ round shape baffled glass reactor. The reactor is equipped with a glass stirrer rod (mounted with a crescent shaped Teflon impeller) and a thermocouple. To the reactor are added 0.07 grams of pMeOCumSt inimer, 90 cm³ hexane (measured at room temperature), 60 cm³ methyl chloride (measured at −92° C.), 0.2 cm³ di-tert-butylpyridine (measured at room temperature) and 24 cm³ isobutylene (measured at −92° C.). Polymerization is started at −92° C. by addition of a pre-chilled mixture of 0.6 cm³ TiCl₄ and 3 cm³ hexane (both measured at room temperature). After 45 minutes of polymerization, a mixture of 7 cm³ of cyclopentadiene (measured at room temperature), 10 cm³ hexanes (measured at room temperature) and 0.1 cm³ di-tert-butylpyridine (measured at room temperature) is added. Upon the addition of the cyclopentadiene charge, the solution turns light orange and dramatically increases in viscosity. Polymerization is terminated at 48 minutes by the addition of 15 cm³ ethanol containing 1 gram of NaOH.

After the evaporation of methyl chloride, hexane is added to the polymer solution and the solution is washed neutral with water. The polymer product is isolated with steam coagulation and dried in an oven at 100° C. under vacuum for 48 hours to remove residual water. The isolated polymeric material for example 11 is white in appearance with a dry weight of 19.0 grams. The resulting material contains a fraction of gel (approximately 78%) and therefore only the soluble portion is fully characterized using HNMR and SEC techniques. The resulting data is presented below in Table 9. HNMR measurement indicates that the overall cyclopentadiene content of the soluble fraction of the polymer is 9 mole percent.

TABLE 9

| Sample | Yield (g) | $M_n$ (kg/mol) | $M_w$ (kg/mol) | $M_z$ (kg/mol) | $M_w/M_n$ | Mole Percent CPD (HNMR) |
|---|---|---|---|---|---|---|
| Example 11 (soluble fraction) | 19.0 | 184 | 776 | 1796 | 4.2 | 9.0 |

Although not limited thereto, the compounds of the present invention are useful in a variety of technical fields. Such fields include, but are not limited to, biomedical applications (e.g., use in stents), tire applications (e.g. use in innerliners), food-related packaging applications, pharmaceutical closures and in various sealant applications. With regard to the use of the compounds of the present invention in various tire applications, in such cases the compounds of the present invention can be further "modified" by a halogenation step (e.g., a bromination or chlorination step). Such halogenation processes are known to those of skill in the art and are not reproduced herein for the sake of brevity.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. An end-functionalized arborescent polymer comprising an arborescent elastomeric polymer block having two or more branching points and a low glass transition temperature ($T_g$) of less than 40° C.; and
one or more end-functionalized portions terminating at least one of the two or more branching points of the arborescent elastomeric polymer block, each end-functionalized portion comprising 0.5 to less than 5 wt. % styrene and exhibiting a glass transition temperature ($T_g$) of less than 40° C.;
wherein the end-functionalized arborescent polymer exhibits thermoplastic elastomeric properties.

2. The end-functionalized arborescent polymer of claim 1, wherein the arborescent elastomeric polymer comprises an arborescent polyisoolefin core.

3. The end-functionalized arborescent polymer of claim 1, wherein the arborescent elastomeric polymer block comprises units formed from at least one inimer of Formula I:

A-B    (I)

wherein A is:

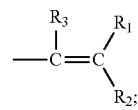

wherein B is:

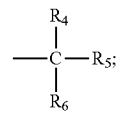

$R_1$, $R_2$, $R_3$, $R_4$, $R_5$ and $R_6$ are each independently selected from the group consisting of hydrogen, halogens, linear or branched $C_1$ to $C_{10}$ alkyls and $C_5$ to $C_8$ aryls; or
$R_1$, $R_2$ and $R_3$ are hydrogen; and
$R_4$, $R_5$ and $R_6$ are each independently selected from the group consisting of hydrogen, hydroxyl, bromine, chlorine, fluorine, iodine, ester (—O—C(O)—$R_7$), peroxide (—OOR$_7$), and —O—$R_7$, wherein $R_7$ is unsubstituted linear or branched $C_1$ to $C_{20}$ alkyl, unsubstituted linear or branched $C_1$ to $C_{10}$ alkyl, substituted linear or branched $C_1$ to $C_{20}$ alkyl, substituted linear or branched $C_1$ to $C_{10}$ alkyl, aryl group having from 2 to about 20 carbon atoms, aryl group having from 9 to 15 carbon atoms, substituted aryl group having from 2 to about 20 carbon atoms or substituted aryl group having from 9 to 15 carbon atoms; or
any one of $R_4$, $R_5$ and $R_6$ is chlorine or fluorine and any remaining $R_4$, $R_5$ and $R_6$ are independently selected from unsubstituted linear or branched $C_1$ to $C_{20}$ alkyls, unsubstituted linear or branched $C_1$ to $C_{10}$ alkyls, substituted linear or branched $C_1$ to $C_{20}$ alkyls and substituted linear or branched $C_1$ to $C_{10}$ alkyls; or
any two of $R_4$, $R_5$ and $R_6$ together form an epoxide and a remaining R group is either hydrogen, unsubstituted linear or branched $C_1$ to $C_{10}$ alkyl, or substituted linear or branched $C_1$ to $C_{10}$ alkyl.

4. The end-functionalized arborescent polymer of claim 3, wherein the inimer of Formula (I) comprises either an aryl or alkyl group joining A and B.

5. The end-functionalized arborescent polymer of claim 3, wherein the inimer of Formula (I) comprises a benzene ring joining A and B.

6. The end-functionalized arborescent polymer of claim 3, wherein the inimer of Formula (I) comprises a linkage of Formula (II):

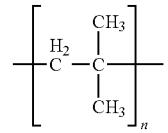

wherein n is an integer in the range of 1 to about 12; joining A and B.

7. The end-functionalized arborescent polymer of claim 3, wherein the arborescent elastomeric polymer is formed from at least one inimer selected from the group consisting of 4-(2-hydroxyisopropyl)styrene, 4-(2-methoxyisopropyl)styrene, 4-(1-methoxyisopropyl)styrene, 4-(2-chloroisopropyl) styrene, 4-(2-acetoxyisopropyl) styrene, 2,3,5,6-tetramethyl-4-(2-hydroxy isopropyl) styrene, 3-(2-methoxyisopropyl) styrene, 4-(epoxyisopropyl)styrene, 4,4,6-trimethyl-6-hydroxyl-1-heptene, 4,4,6-trimethyl-6-chloro-1-heptene, 4,4,6-trimethyl-6,7-epoxy-1-heptene, 4,4,6,6,8-pentamethyl-8-hydroxyl-1-nonene, 4,4,6,6,8-pentamethyl-8-chloro-1-nonene, 4,4,6,6,8-pentamethyl-8,9-epoxy-1-nonene, 3,3,5-trimethyl-5-hydroxyl-1-hexene, 3,3,5-trimethyl-5-chloro-1-hexene, 3,3,5-trimethyl-5-6-epoxy-1-hexene, 3,3,5,5,7-pentamethyl-7-hydroxyl-1-octene, 3,3,5,5,7-pentamethyl-7-chloro-1-octene, and 3,3,5,5,7-pentamethyl-7,8-epoxy-1-octene.

8. The end-functionalized arborescent polymer of claim 3, wherein the arborescent elastomeric polymer is formed from at least one of 4-(2-methoxyisopropyl)styrene or 4-(epoxyisopropyl)styrene.

9. The end-functionalized arborescent polymer of claim 1, wherein the arborescent elastomeric polymer is formed from at least one isoolefin of Formula (III):

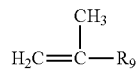

(III)

wherein $R_9$ is $C_1$ to $C_4$ alkyl.

10. The end-functionalized arborescent polymer of claim 1, wherein the arborescent elastomeric polymer is formed from isobutylene or 2-methyl-1-butene.

11. The end-functionalized arborescent polymer of claim 1, wherein the at least one end-block is formed from one or more cationically polymerizable monomers.

12. The end-functionalized arborescent polymer of claim 1, wherein the at least one end-block comprises monomeric units derived from monovinylidiene arenes.

13. The end-functionalized arborescent polymer of claim 12, wherein the monovinylidiene arene monomer is selected from the group consisting of styrene, p-methylstyrene, p-tert-butylstyrene, p-chlorostyrene, indene, and mixtures thereof.

14. The end-functionalized arborescent polymer of claim 1, wherein the at least one end-block has a number average molecular weight of less than about 10,000 g/mol.

15. The end-functionalized arborescent polymer of claim 1, further comprising at least one filler.

16. The end-functionalized arborescent polymer of claim 15, wherein the at least one filler interacts with the end-blocks of the end-functionalized thermoplastic elastomeric arborescent polymer.

17. The end-functionalized arborescent polymer of claim 1, wherein the arborescent elastomeric polymer comprises a saturated core; and
the at least one end-block is unsaturated.

18. The end-functionalized arborescent polymer of claim 1, wherein the end-functionalized arborescent polymer is crosslinked or cured to provide a vulcanized article.

* * * * *